United States Patent
Yonemoto

(10) Patent No.: US 10,781,369 B2
(45) Date of Patent: Sep. 22, 2020

(54) WAVELENGTH CONVERSION MEMBER AND BACKLIGHT UNIT

(71) Applicant: FUJIFILM Corporation, Tokyo (JP)

(72) Inventor: Takashi Yonemoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/426,313

(22) Filed: May 30, 2019

(65) Prior Publication Data

US 2019/0292453 A1    Sep. 26, 2019

Related U.S. Application Data

(63) Continuation of application No. PCT/JP2017/042858, filed on Nov. 29, 2017.

(30) Foreign Application Priority Data

Nov. 30, 2016  (JP) ................. 2016-233229

(51) Int. Cl.
    *C09K 11/70*    (2006.01)
    *B32B 27/30*    (2006.01)
    (Continued)

(52) U.S. Cl.
    CPC .............. *C09K 11/70* (2013.01); *B32B 27/30* (2013.01); *C08F 220/10* (2013.01); *C08J 7/04* (2013.01);
    (Continued)

(58) Field of Classification Search
    CPC ....... C09K 11/70; C09K 11/08; C09K 11/025; C09K 11/56; G02B 5/20; F21V 9/00;
    (Continued)

(56) References Cited

U.S. PATENT DOCUMENTS 8,558,446 B2 * 10/2013 Miki .................... H01L 33/507
                                                              313/502
2014/0168576 A1    6/2014 Lee
(Continued)

FOREIGN PATENT DOCUMENTS

| JP | 2007161944 A | 6/2007 |
| JP | 2013197530 A | 9/2013 |
| JP | 2016103576 A | 6/2016 |
| WO | 2012144426 A1 | 10/2012 |
| WO | 2017026118 A1 | 12/2017 |

OTHER PUBLICATIONS

International Search Report Issued in PCT/JP2017/042858 dated Feb. 20, 2018.
(Continued)

*Primary Examiner* — Ali Alavi
(74) *Attorney, Agent, or Firm* — Edwards Neils LLC; Jean C. Edwards, Esq.

(57) ABSTRACT

Provided are a wavelength conversion member which contains a phosphor such as a quantum dot and has high reproducibility of white light; and a backlight unit. The wavelength conversion member includes a wavelength conversion layer having a resin layer that is provided with a plurality of concave portions which are discretely disposed on one main surface thereof; and a plurality of fluorescent regions containing phosphors, which are disposed in the concave portions formed in the resin layer, in which a surface roughness Ra of a surface of the resin layer on a side where the concave portions are formed is 0.3 to 5 μm.

16 Claims, 4 Drawing Sheets

(51) Int. Cl.
*C08F 220/10* (2006.01)
*C08J 7/04* (2020.01)
*C09K 11/02* (2006.01)
*C09K 11/56* (2006.01)
*G02B 5/20* (2006.01)
*F21V 9/00* (2018.01)
*C09K 11/08* (2006.01)
*F21S 2/00* (2016.01)

(52) U.S. Cl.
CPC ............ *C09K 11/025* (2013.01); *C09K 11/08* (2013.01); *C09K 11/56* (2013.01); *F21S 2/00* (2013.01); *F21V 9/00* (2013.01); *G02B 5/20* (2013.01); *Y02B 20/181* (2013.01)

(58) Field of Classification Search
CPC .... F21S 2/00; B32B 27/30; C08J 7/04; Y02B 20/181
USPC .......................................................... 362/84
See application file for complete search history.

(56) References Cited

U.S. PATENT DOCUMENTS

| | | |
|---|---|---|
| 2014/0178648 A1 | 6/2014 | Dubrow |
| 2018/0138027 A1 | 5/2018 | Oku et al. |
| 2019/0258098 A1* | 8/2019 | Oba ...................... G02F 1/1336 |
| 2019/0363226 A1* | 11/2019 | Musashi ................. H01L 33/58 |

OTHER PUBLICATIONS

Written Opinion Issued in PCT/JP2017/042858 dated Feb. 20, 2018.
International Preliminary Report on Patentability Issued in PCT/JP2017/042858 dated Jun. 4, 2019.
Office Action, issued by the Japanese Patent Office dated Jan. 28, 2020, in connection with Japanese Patent Application No. 2018-554206.
Office Action, issued by the Japanese Patent Office dated Jun. 2, 2020, in connection with Japanese Patent Application No. 2018-554206.

* cited by examiner

WAVELENGTH CONVERSION MEMBER AND BACKLIGHT UNIT

CROSS-REFERENCE TO RELATED APPLICATIONS

This application is a Continuation of PCT International Application No. PCT/JP2017/042858 filed on Nov. 29, 2017, which was published under PCT Article 21(2) in Japanese, and which claims priority under 35 U.S.C. § 119(a) to Japanese Patent Application No. 2016-233229 filed on Nov. 30, 2016. The above applications are hereby expressly incorporated by reference, in their entirety, into the present application.

BACKGROUND OF THE INVENTION

1. Field of the Invention

The present invention relates to a wavelength conversion member including a phosphor that emits fluorescence upon irradiation with excitation light and a backlight unit comprising the wavelength conversion member.

2. Description of the Related Art

Applications of a flat panel display such as a liquid crystal display (LCD) as a space-saving image display device with low power consumption have been widespread year by year. In recent liquid crystal displays, further power saving, an enhancement in color reproducibility, or the like is required as an improvement in LCD performance.

Along with power saving of LCD backlight, in order to increase the light utilization efficiency and improve the color reproducibility, it has been proposed to use a wavelength conversion member having a wavelength conversion layer containing a quantum dot (QD, also referred to as a quantum point) that converts a wavelength of an incidence ray and emits the wavelength-converted light, as a luminescent material (phosphor).

The quantum dot has a state of an electron whose movement direction is restricted in all directions three-dimensionally. In a case where nanoparticles of a semiconductor are three-dimensionally surrounded by a high potential barrier, the nanoparticles become quantum dots. The quantum dot expresses various quantum effects. For example, a "quantum size effect" is expressed in which a density of electronic states (energy level) is discretized. According to this quantum size effect, the absorption wavelength and luminescence wavelength of light can be controlled by changing the size of a quantum dot.

Generally, such quantum dots are dispersed in a resin or the like, and used as a wavelength conversion member that performs wavelength conversion, for example, by being disposed between a backlight and a liquid crystal panel.

In a case where excitation light is incident from a backlight to a wavelength conversion member containing quantum dots, the quantum dots are excited to emit fluorescence. Here, white light can be realized by using quantum dots having different luminescence properties and causing each quantum dot to emit light having a narrow half-width of red light, green light, or blue light. Alternatively, white light can also be realized with the excitation light transmitted through the wavelength conversion member and the luminescence of quantum dots, by using blue light as excitation light and using quantum dots that emit yellow light.

Since the fluorescence by the quantum dot has a narrow half-width, wavelengths can be properly selected to thereby allow the resulting white light to be designed so that the white light is high in luminance and excellent in color reproducibility.

For example, US2014/0178648A discloses an optical component having a substrate having one or more concave portions and one or a plurality of compositions disposed in the concave portions and containing a plurality of luminescent nanocrystals.

SUMMARY OF THE INVENTION

Meanwhile, a flat panel display such as an LCD is required to be further thinned, and further thinning of a wavelength conversion member used for the flat panel display is also demanded.

According to the investigation by the present inventors, it was found that, in a case where the wavelength conversion member (wavelength conversion layer) is made thin, the content of the phosphor in the wavelength conversion layer is reduced, so there is a problem that the amount of luminescence from the phosphor is reduced and then the color reproducibility is lowered. In addition, it was found that, in a case where the wavelength conversion layer is made thin, influence of in-plane thickness unevenness is increased, so that the amount of fluorescence emitted varies depending on the position, thus resulting in a problem that color unevenness occurs and the color reproducibility is lowered.

The present invention has been made in view of the above circumstances, and an object of the present invention is to provide a wavelength conversion member which contains a phosphor such as a quantum dot and has high color reproducibility, and a backlight unit comprising the wavelength conversion member.

As a result of extensive studies to achieve the foregoing object, the present inventors have found that the foregoing object can be achieved by a wavelength conversion member that absorbs at least a part of incident excitation light, converts the absorbed light into light having a wavelength different from the wavelength of the excitation light, and emits the wavelength-converted light, the wavelength conversion member including: a wavelength conversion layer having a resin layer that is provided with a plurality of concave portions which are discretely disposed on one main surface thereof; and a plurality of fluorescent regions containing phosphors, which are disposed in the concave portions formed in the resin layer, in which a surface roughness Ra of a surface of the resin layer on a side where the concave portions are formed is 0.3 to 5 μm. The present invention has been completed based on these findings.

That is, it has been found that the foregoing object can be achieved by the following configuration.

(1) A wavelength conversion member that absorbs at least a part of incident excitation light, converts the absorbed light into light having a wavelength different from the wavelength of the excitation light, and emits the wavelength-converted light, the wavelength conversion member comprising:

a wavelength conversion layer having a resin layer that is provided with a plurality of concave portions which are discretely disposed on one main surface thereof; and a plurality of fluorescent regions containing phosphors, which are disposed in the concave portions formed in the resin layer, in which a surface roughness Ra of a surface of the resin layer on a side where the concave portions are formed is 0.3 to 5 μm.

(2) The wavelength conversion member according to (1), in which a refractive index difference Δn between the resin layer and the fluorescent region is 0.05 or more.

(3) The wavelength conversion member according to (1) or (2), in which scattering particles are contained in at least one of the resin layer or the fluorescent region.

(4) The wavelength conversion member according to any one of (1) to (3), in which a depth of the concave portion formed in the resin layer is 1 to 150 μm.

(5) The wavelength conversion member according to any one of (1) to (4), in which a width of the concave portion formed in the resin layer is 10 to 2000 μm.

(6) The wavelength conversion member according to any one of (1) to (5), in which the wavelength conversion layer has two or more types of fluorescent regions that emit light in different wavelength ranges.

(7) The wavelength conversion member according to any one of (1) to (6), further comprising two substrate films laminated with the wavelength conversion layer interposed therebetween.

(8) The wavelength conversion member according to any one of (1) to (7), in which a thickness of the wavelength conversion layer is 5 to 150 μm.

(9) A backlight unit comprising:
the wavelength conversion member according to any one of (1) to (8); and
a light source for emitting excitation light.

According to the present invention, provided are a wavelength conversion member which contains a phosphor such as a quantum dot and has high reproducibility of white light; and a backlight unit comprising the wavelength conversion member.

DESCRIPTION OF THE PREFERRED EMBODIMENTS

Figure 1:
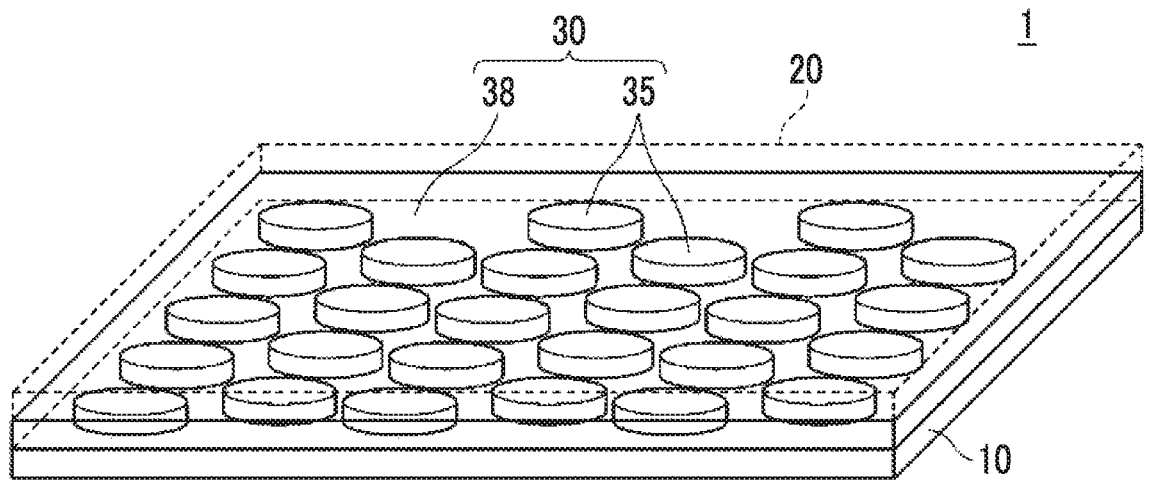
FIG. 1 is a perspective view schematically showing an example of a wavelength conversion member of the present invention.

Hereinafter, embodiments of a wavelength conversion member and a backlight unit comprising the wavelength conversion member according to the embodiment of the present invention will be described with reference to the accompanying drawings. In the drawings of the present specification, the scale of each part is appropriately changed for easy visual recognition. In the present specification, the numerical range expressed by using "to" means a range including numerical values described before and after "to" as a lower limit value and an upper limit value, respectively.

Further, in the present specification, the term "(meth)acrylate" refers to at least one or any one of acrylate or methacrylate. The same applies to "(meth)acryloyl" and the like.

<Wavelength Conversion Member>

The wavelength conversion member according to the embodiment of the present invention is a wavelength conversion member that absorbs at least a part of incident excitation light, converts the absorbed light into light having a wavelength different from the wavelength of the excitation light, and emits the wavelength-converted light, the wavelength conversion member including:

a wavelength conversion layer having a resin layer that is provided with a plurality of concave portions which are discretely disposed on one main surface thereof; and a plurality of fluorescent regions containing phosphors, which are disposed in the concave portions formed in the resin layer, in which a surface roughness Ra of a surface of the resin layer on a side where the concave portions are formed is 0.3 to 5 μm.

Figure 2:
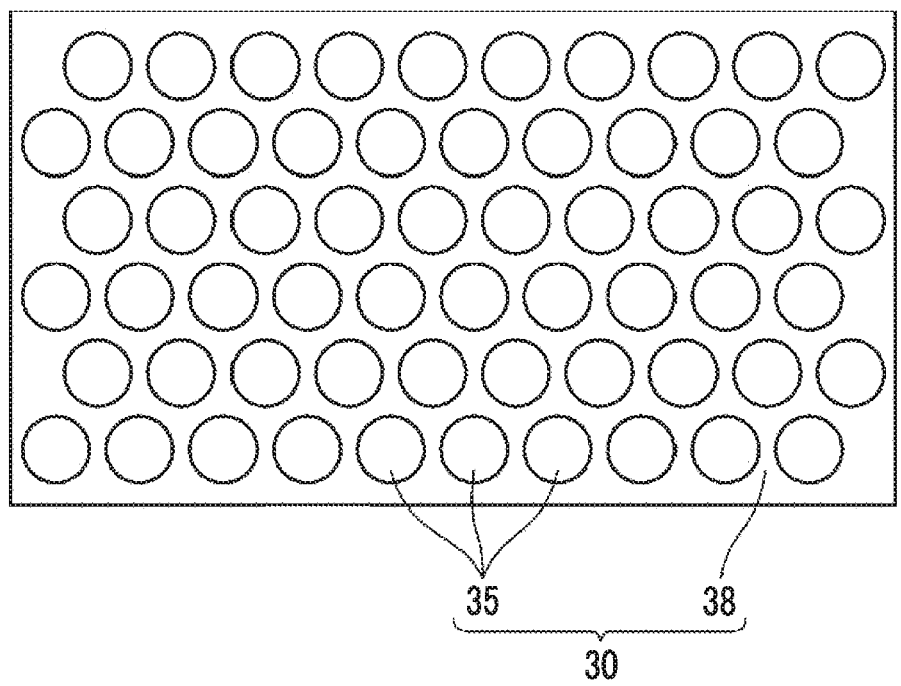
FIG. 2 is a plan view of the wavelength conversion member of FIG. 1.
Figure 3:
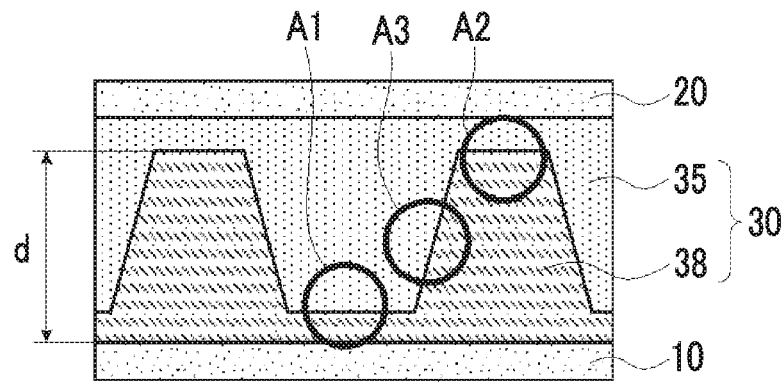
FIG. 3 is a cross-sectional view of the wavelength conversion member of FIG. 1.

FIG. 1 is a perspective view schematically showing an example of a wavelength conversion member 1 according to the embodiment of the present invention, FIG. 2 is a plan view of FIG. 1, and FIG. 3 is a cross-sectional view of FIG. 1. For the sake of explanation in FIG. 1, a second substrate film 20 is indicated by a broken line and a wavelength conversion layer 30 is indicated by a solid line.

The wavelength conversion member 1 of the present embodiment comprises a first substrate film 10; the wavelength conversion layer 30 in which a plurality of regions 35 containing phosphors 31 which are excited by excitation light and emit fluorescence are discretely disposed on the first substrate film 10 and resin layers 38 are disposed between the discretely disposed regions 35 containing phosphors 31; and a second substrate film 20 disposed on the wavelength conversion layer 30. Hereinafter, the region 35 containing the phosphors 31 is referred to as a fluorescent region 35.

In other words, the wavelength conversion layer 30 has a configuration which has the resin layer 38 and the fluorescent region 35, in which a plurality of concave portions are discretely formed in the resin layer 38, and the fluorescent region 35 is disposed in the concave portion of the resin layer 38.

In the present specification, the phrase "a plurality of regions containing phosphors . . . are discretely disposed on the first substrate film" means that, as shown in FIGS. 1 and 2, a plurality of fluorescent regions 35 are disposed in isolation from one another in the two-dimensional direction along the film surface of the first substrate film 10 in a case of being observed from the direction perpendicular to the film surface of the first substrate film (in plan view). In the example shown in FIG. 1, the fluorescent regions 35 have a columnar shape (disc shape), and are surrounded by the resin layers 38 and individually isolated from one another in a two-dimensional direction along the film surface of the first substrate film 10, so that the penetration of oxygen from the two-dimensional direction along the film surface of the first substrate film 10 into the individual fluorescent regions 35 is blocked.

As shown in FIG. 3, the fluorescent regions 35 may be disposed in a plurality of concave portions of the resin layer 38 and may be formed so as to cover an upper portion of a concavo-convex surface of the resin layer 38. That is, with regard to the fluorescent regions 35, independently disposed parts in individual concave portions may be partially connected.

Here, in the wavelength conversion member according to the embodiment of the present invention, a surface roughness Ra of a surface of the resin layer on a side where the concave portions are formed is 0.3 to 5 µm. That is, the surface roughness Ra of the surface of the resin layer in contact with the fluorescent region is 0.3 to 5 µm.

As described above, further reduction in thickness is required for a flat panel display such as an LCD, and further reduction in thickness is also required for the wavelength conversion member used for the flat panel display.

However, according to the investigation by the present inventors, it was found that, in a case where the wavelength conversion member (wavelength conversion layer) is made thin, the content of the phosphor in the wavelength conversion layer is reduced, so there is a problem that the amount of luminescence from the phosphor is reduced and then the color reproducibility is lowered. For example, in a case of embodying white light using blue light as the excitation light and using quantum dots that emit yellow light, the white light is embodied by balancing the light quantities of the excitation light (blue light) transmitted through the wavelength conversion member and the fluorescence (yellow light) emitted by the quantum dots, but white light cannot be accurately embodied in a case where the amount of fluorescence emitted by the quantum dots is small relative to the excitation light transmitted through the wavelength conversion member.

In addition, it was found that, in a case where the wavelength conversion layer is made thin, influence of in-plane thickness unevenness is increased, so that the amount of fluorescence emitted varies depending on the position, thus resulting in a problem that the color reproducibility is lowered. For example, in a case of embodying white light using three types of quantum dots that emit red light, green light, and blue light, respectively, the balance of the light quantities of red light, green light, and blue light is lost and then white light cannot be accurately reproduced in a case where the amount of luminescence varies depending on the position.

On the other hand, the wavelength conversion member according to the embodiment of the present invention has a configuration in which the wavelength conversion layer has resin layers having a plurality of concave portions formed thereon and fluorescent regions containing phosphors, the fluorescent regions being disposed in the plurality of concave portions, and the surface roughness Ra of the concave portion side surface of the resin layer being 0.3 to 5 µm.

By disposing the fluorescent regions in a plurality of concave portions formed in the resin layer, it is possible to form each fluorescent region with a uniform thickness and it is therefore possible to suppress a decrease in color reproducibility due to variations in thickness, even in a case where the wavelength conversion layer is made thin.

In addition, by setting the surface roughness Ra of the surface of the resin layer on the side where the concave portions are formed to 0.3 to 5 µm, the fluorescence emitted by the phosphors in the fluorescent region is scattered, whereby the light quantities of fluorescence emitted from the main surface side of the wavelength conversion member can be increased and therefore the decrease in color reproducibility due to the insufficient light quantities of fluorescence can be suppressed.

Here, in a configuration in which the fluorescent region is simply a flat layer and the surface of the member adjacent to the fluorescent region is roughened to scatter light, fluorescence cannot be sufficiently scattered. On the other hand, in a configuration in which a concave portion is formed in the resin layer, the surface roughness Ra thereof is set to 0.3 to 5 µm, and a surface at an angle different from the surface of the wavelength conversion member, such as the side surface of the concave portion, is roughened, the fluorescence from the phosphor emitting light in various directions can be more suitably scattered and therefore the light quantity of fluorescence emitted from the main surface side of the wavelength conversion member can be increased.

For example, in the configuration in which the fluorescent region is a flat layer and the surface of the member adjacent to the fluorescent region is roughened, it is difficult for the fluorescence traveling in a direction substantially parallel to the surface of the wavelength conversion member to be sufficiently scattered. In contrast, in the configuration in which the concave portion is formed in the resin layer and the surface thereof is roughened, the fluorescence traveling in the direction substantially parallel to the surface of the wavelength conversion member can be easily scattered, so that the fluorescence traveling in the direction substantially parallel to the surface of the wavelength conversion member can be guided in the direction substantially perpendicular to the surface of the wavelength conversion member and therefore the light quantity of fluorescence emitted from the main surface side of the wavelength conversion member can be increased.

In addition, in a case where the surface on which a plurality of concave portions are formed is roughened, the substantial surface area of the rough surface can be increased, and therefore the effects of scattering due to roughening can be further enhanced.

Here, the surface roughness Ra of the surface of the resin layer on the side where the concave portions are formed is preferably 0.5 to 2 µm and more preferably 0.6 to 1.5 µm.

The surface roughness Ra of the resin layer was determined by cutting the wavelength conversion member with a microtome to form a cross section and observing the cross section with a scanning electron microscope. Specifically, Ra was determined according to JIS B0601 from the roughness curve of the interface between the resin layer and the phosphor-containing layer in the observed cross section. The evaluation length was 50 µm and the average value of n=5 was used.

However, in a case where the width of the adjacent fluorescent region 35, that is, the thickness t of the resin layer 38 is less than 50 µm, the evaluation length at the time of Ra calculation is made equal to t.

Figure 4:
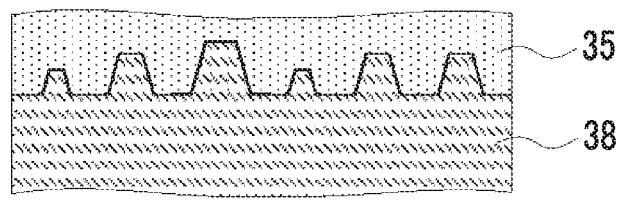
FIG. 4 is a partially enlarged cross-sectional view schematically showing a boundary between a resin layer and a fluorescent region.

In addition, the surface of the resin layer on the side where the concave portions are formed may be randomly roughened, or as shown in FIG. 4, the surface of the resin layer may be roughened with formation of fine convex portions in a predetermined pattern.

In addition, only a part of the resin layer, such as the bottom surface of the concave portion, the top surface of the convex portion, or the slope surface extending from the bottom surface to the top surface, may be roughened.

Here, in the present invention, the difference Δn between the refractive index of the resin layer 38 and the refractive index of the fluorescent region 35 is preferably 0.05 or more, more preferably 0.1 or more, and still more preferably 0.4 or more and 2.0 or less.

In a case where the refractive index difference Δn between the resin layer 38 and the fluorescent region is set to fall within the above range, the luminescence from the fluorescent region 35 can be more suitably scattered.

In addition, in the wavelength conversion member according to the embodiment of the present invention, in a case where the depth of the concave portion of the resin layer 38 where the fluorescent region 35 is disposed is h, and the width between the adjacent fluorescent regions 35, that is, the thickness of the resin layer 38 is t, the depth h of the concave portion of the resin layer 38 is preferably 1 μm or more and 150 μm or less, the width t between the adjacent fluorescent regions 35 is preferably 5 μm or more and 300 μm or less, and the aspect ratio h/t of the depth h to the width t between the adjacent fluorescent regions 35 is preferably less than 3.0.

In addition, the width of the concave portion, that is, the width of the fluorescent region is preferably 10 pun or more and 2000 μm or less.

In a case where the depth h of the concave portion of the resin layer 38 is set to 1 μm or more and 100 μm or less, it is possible to suitably suppress variations in the in-plane thickness of the fluorescent region 35, and it is also possible to suitably obtain the effects of scattering due to roughening.

In addition, in a case where the width of the concave portion is set to 10 μm or more and 2000 μm or less, it is possible to secure the light quantity of the phosphor.

In addition, in a case where the width t between the adjacent fluorescent regions 35 is set to 5 μm or more and 300 μm or less, it is possible to suppress visibility of the resin layer, it is possible to secure the strength of the resin layer having a plurality of concave portions, and it is possible to suitably suppress variations in the in-plane thickness of the fluorescent region 35. In addition, it is possible to suitably obtain the effects of scattering due to roughening.

In addition, in a case where the aspect ratio h/t of width t to depth h between the adjacent fluorescent regions 35 is set to less than 3.0, it is possible to secure the strength of the resin layer and it is possible to suitably suppress variations in the in-plane thickness of the fluorescent region 35.

The depth h of the concave portion formed in the resin layer 38 is determined in such a manner that a portion of the concave portion of the wavelength conversion member is cut with a microtome to form a cross section; the wavelength conversion layer is irradiated with excitation light to cause the phosphor to emit light; in this state, this cross section is observed with a confocal laser microscope; and 10 concave portions are extracted and the depth thereof is measured and the measured values are averaged.

The width t between the adjacent fluorescent regions 35 (the thickness t of the resin layer 38 portion) is the shortest distance between the adjacent fluorescent regions 35 at the central coordinate in the thickness direction (intermediate between the convex portion and the concave portion of the resin layer 38), and is determined in such a manner that the wavelength conversion layer is irradiated with excitation light to cause the phosphor to emit light; in this state, the surface is observed from one surface of the wavelength conversion member using a confocal laser microscope; at least 20 resin layers 38 between the adjacent fluorescent regions 35 are extracted and the width thereof is read; and the average value of these read values is calculated as the width t.

The width of the concave portion is the length of the maximum width of the opening surface of the concave portion. For example, in a case where the shape of the opening surface of the concave portion is circular, the width of the concave portion is the diameter, and in a case where the shape of the opening surface of the concave portion is rectangular, the width of the concave portion is the length of the diagonal line.

The width of the concave portion is determined in such a manner that the wavelength conversion layer is irradiated with excitation light to cause the phosphor to emit light; in this state, the surface is observed from one surface of the wavelength conversion member using a confocal laser microscope; at least 20 concave portions are extracted and the width thereof is read; and the average value of these read values is calculated as the width of the concave portion.

Figure 5:
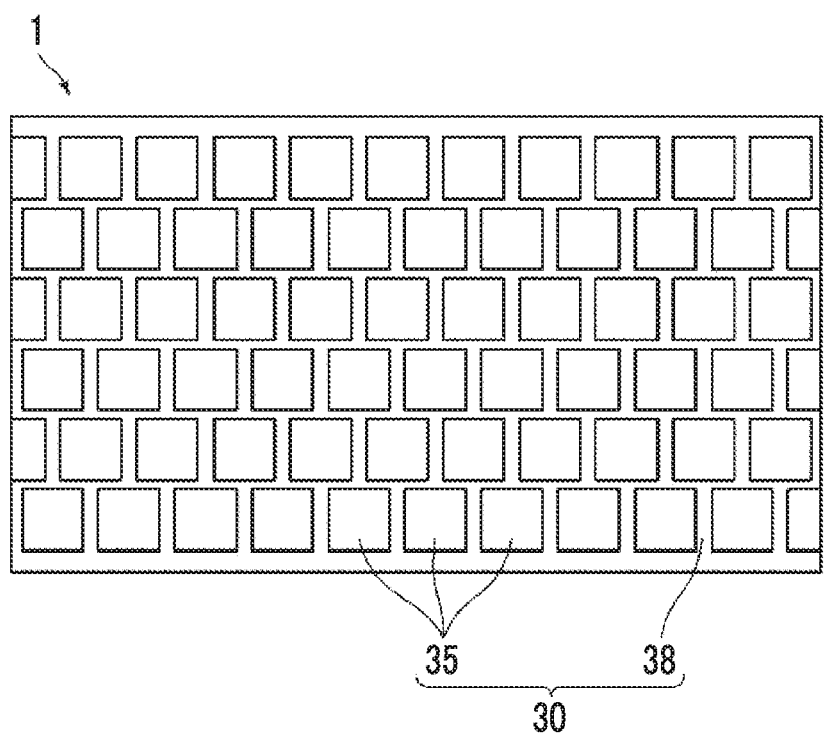
FIG. 5 is a plan view showing another example of a plan view pattern of the fluorescent region.
Figure 6:
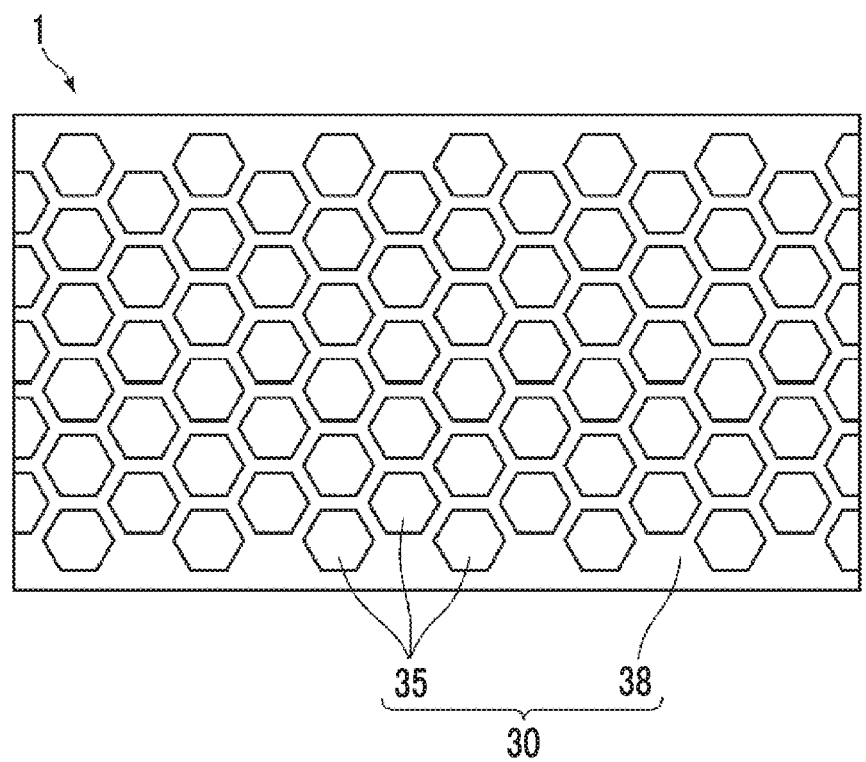
FIG. 6 is a plan view showing another example of the plan view pattern of the fluorescent region.

In the example shown in FIG. 1, the shape of the concave portion of the resin layer 38, that is, the shape of the fluorescent region 35 is columnar and is circular in plan view, but the shape of the fluorescent region 35 is not particularly limited. The fluorescent region 35 may be a polygonal prism or a regular polygonal prism such as a quadrangular in plan view as shown in FIG. 5, or a hexagon in plan view as shown in FIG. 6. In the above example, the bottom surface of the column or the polygonal prism is disposed parallel to the substrate film surface, but the bottom surface may not necessarily be disposed parallel to the substrate film surface. Further, the shape of each fluorescent region 35 may be amorphous.

Figure 7:
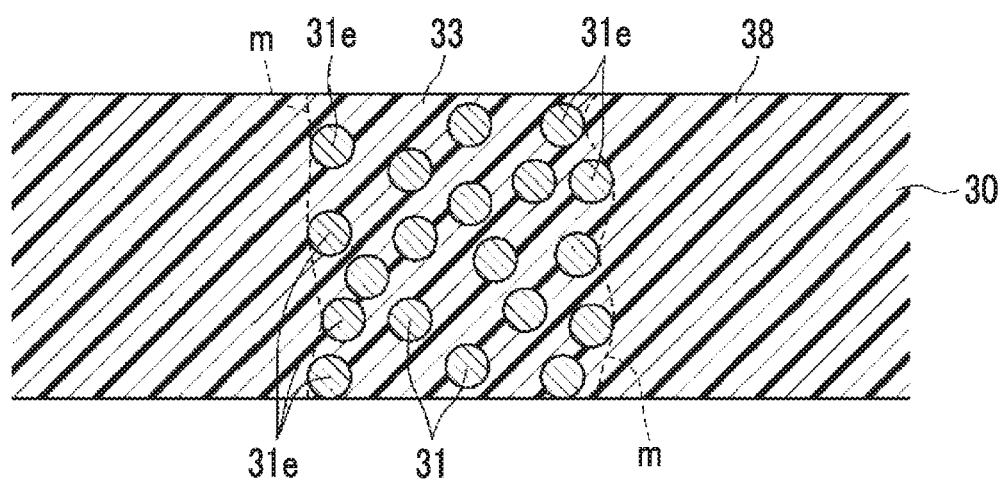
FIG. 7 is a view for explaining a method of specifying a contour of the fluorescent region.

In a case where the boundary between the binder 33 in the fluorescent region 35 and the resin layer 38 between the fluorescent regions 35 is not clear, as shown in FIG. 7, a line connecting the points on the outside (the side on which the phosphor 31 is not disposed) of the phosphor 31e positioned at the outermost portion of the region where the phosphor 31 is closely disposed is considered as the contour m of the fluorescent region 35 (the boundary between the fluorescent region 35 and the resin layer 38). The position of the phosphor can be specified by irradiation of the wavelength conversion layer with excitation light to cause the phosphor to emit light, followed by observation with, for example, a confocal laser microscope or the like, whereby the contour m of the fluorescent region 35 can be specified. In the present specification, the side of a column or a polygonal prism is allowed to meander like the contour in FIG. 7.

In the above embodiment, the fluorescent region 35 is periodically disposed in a pattern, but it may be non-periodic as long as the desired performance is not impaired in a case where a plurality of fluorescent regions 35 are discretely disposed. It is preferred that the fluorescent region 35 is uniformly distributed over the entire region of the wavelength conversion layer 30 because the in-plane distribution of luminance is uniform.

In order to obtain a sufficient amount of fluorescence, it is desirable to make the area occupied by the fluorescent region 35 as large as possible.

The phosphor 31 in the fluorescent region 35 may be of one type or of plural types. In addition, the phosphor 31 in one fluorescent region 35 is regarded as one type, and a region containing a first phosphor and a region containing a second phosphor different from the first phosphor among the plurality of fluorescent regions 35 may be disposed periodically or non-periodically. The type of the phosphor may be three or more.

The wavelength conversion layer 30 may be formed by laminating a plurality of fluorescent regions 35 in the thickness direction of the film.

The thickness of the wavelength conversion layer 30 is preferably 5 to 150 μm and more preferably 5 to 50 μm. In a case where the thickness of the wavelength conversion layer 30 is set to fall within the above range, it is possible to suppress a decrease in color reproducibility due to insufficient light quantity of fluorescence while reducing the thickness of the wavelength conversion member.

Individual constituent elements of the wavelength conversion member according to the embodiment of the present invention will be described below.

The wavelength conversion member 1 has a configuration in which the wavelength conversion layer 30 is laminated on one film surface of the first substrate film 10 and the second substrate film 20 is laminated on the wavelength conversion layer 30, so that wavelength conversion layer 30 is sandwiched between two substrate films 10 and 20.

—Wavelength Conversion Layer—

The wavelength conversion layer 30 comprises a resin layer 38 in which a plurality of concave portions disposed discretely are formed, and a plurality of fluorescent regions 35 containing phosphors 31, which are disposed in the plurality of concave portions formed in the resin layer 38.

«Region Containing Phosphors (Fluorescent Region)»

The fluorescent region 35 is constituted of phosphors 31 and a binder 33 in which the phosphors 31 are dispersed and is formed by applying and curing a coating liquid for forming a fluorescent region containing the phosphors 31 and a curable composition to be the binder 33.

<Phosphor>

A variety of known phosphors can be used as the phosphor. Examples of the phosphor include inorganic phosphors such as rare earth doped garnet, silicates, aluminates, phosphates, ceramic phosphors, sulfide phosphors, nitride phosphors, oxynitride phosphors, and fluoride phosphors, and organic fluorescent substances such as organic fluorescent dyes and organic fluorescent pigments. In addition, phosphors with rare earth-doped semiconductor fine particles, and semiconductor nanoparticles (quantum dots and quantum rods) are also suitably used. A single type of phosphor may be used alone, but a plurality of phosphors having different wavelengths may be mixed and used so as to obtain a desired fluorescence spectrum, or a combination of phosphors of different material constitutions (for example, a combination of a rare earth doped garnet and quantum dots) may be used.

In the following description, quantum dots will be mainly described as the phosphor. However, the phosphor of the present invention is not limited to quantum dots and is not particularly limited as long as it is a material that converts energy from the outside into light or converts light into electricity, such as a fluorescent coloring agent or a photoelectric conversion material.

(Quantum Dot)

The quantum dot is a fine particle of a compound semiconductor having a size of several nm to several tens of nm and is at least excited by incident excitation light to emit fluorescence.

The phosphor of the present embodiment may include at least one quantum dot or may include two or more quantum dots having different luminescence properties. Known quantum dots include a quantum dot (A) having a luminescence center wavelength in a wavelength range of 600 nm or more and 680 nm or less, a quantum dot (B) having a luminescence center wavelength in a wavelength range of 500 nm or more to less than 600 nm, and a quantum dot (C) having a luminescence center wavelength in a wavelength range of 400 nm or more to less than 500 nm, and the quantum dot (A) is excited by excitation light to emit red light, the quantum dot (B) is excited by excitation light to emit green light, and the quantum dot (C) is excited by excitation light to emit blue light. For example, in a case where blue light is incident as excitation light to a wavelength conversion layer containing the quantum dot (A) and the quantum dot (B), red light emitted from the quantum dot (A), green light emitted from the quantum dot (B) and blue light transmitted through the wavelength conversion layer can realize white light. Alternatively, ultraviolet light can be incident as excitation light to a wavelength conversion layer containing the quantum dots (A), (B), and (C), thereby allowing red light emitted from the quantum dot (A), green light emitted from the quantum dot (B), and blue light emitted from the quantum dot (C) to realize white light.

With respect to the quantum dot, reference can be made to, for example, paragraphs [0060] to [0066] of JP2012-169271A, but the quantum dot is not limited to those described therein. As the quantum dot, commercially available products can be used without any limitation. The luminescence wavelength of the quantum dot can usually be adjusted by the composition and size of the particles.

The quantum dots can be added in an amount of, for example, about 0.1 to 10 parts by mass with respect to 100 parts by mass of the total amount of the coating liquid.

The quantum dots may be added into the coating liquid in the form of particles or in the form of a dispersion liquid in which the quantum dots are dispersed in an organic solvent. It is preferred that the quantum dots are added in the form of a dispersion liquid, from the viewpoint of suppressing aggregation of quantum dot particles. The organic solvent used for dispersing the quantum dots is not particularly limited.

As the quantum dots, for example, core-shell type semiconductor nanoparticles are preferable from the viewpoint of improving durability. As the core, Group II-VI semiconductor nanoparticles, Group III-V semiconductor nanoparticles, multi-component semiconductor nanoparticles, and the like can be used. Specific examples thereof include, but are not limited to, CdSe, CdTe, CdS, ZnS, ZnSe, ZnTe, InP, InAs, and InGaP. Among them, CdSe, CdTe, InP, InGaP are preferable from the viewpoint of emitting visible light with high efficiency. As the shell, CdS, ZnS, ZnO, GaAs, and complexes thereof can be used, but it is not limited thereto. The luminescence wavelength of the quantum dot can usually be adjusted by the composition and size of the particles.

The quantum dot may be a spherical particle or may be a rod-like particle also called a quantum rod, or may be a tetrapod-type particle. A spherical quantum dot or rod-like quantum dot (that is, a quantum rod) is preferable from the viewpoint of narrowing a full width at half maximum (FWHM) and enlarging the color reproduction range of a liquid crystal display.

A ligand having a Lewis basic coordinating group may be coordinated on the surface of the quantum dot. It is also possible to use quantum dots in which such a ligand is already coordinated. Examples of the Lewis basic coordinating group include an amino group, a carboxy group, a mercapto group, a phosphine group, and a phosphine oxide group. Specific examples thereof include hexylamine, decylamine, hexadecylamine, octadecylamine, oleylamine, myristylamine, laurylamine, oleic acid, mercaptopropionic acid, trioctylphosphine, and trioctylphosphine oxide. Among these, hexadecylamine, trioctylphosphine, and trioctylphosphine oxide are preferable, and trioctylphosphine oxide is particularly preferable.

Quantum dots in which these ligands are coordinated can be prepared by a known synthesis method. For example, such quantum dots can be synthesized by the method described in C. B. Murray, D. J. Norris, M. G. Bawendi, Journal American Chemical Society, 1993, 115(19), pp. 8706 to 8715, or The Journal Physical Chemistry, 101, pp. 9463 to 9475, 1997. In addition, commercially available quantum dots in which the ligands are coordinated can be used without any limitation. For example, Lumidot (manufactured by Sigma-Aldrich Co. LLC.) can be mentioned.

In the present invention, the content of the ligand-coordinated quantum dots is preferably 0.01% to 10% by mass and more preferably 0.05% to 5% by mass with respect to the total mass of the polymerizable compound contained in the quantum dot-containing composition to be the fluorescent region. It is desirable to adjust the concentration, depending on the thickness of the wavelength conversion member.

The quantum dots may be added to the quantum dot-containing composition in the form of particles or in the form of a dispersion liquid dispersed in a solvent. It is preferable to add the quantum dots in the form of a dispersion liquid from the viewpoint of suppressing aggregation of particles of quantum dots. The solvent used here is not particularly limited.

(Method for Synthesizing Ligand)

The ligand in the quantum dot-containing composition can be synthesized by a known synthesis method. For example, the ligand can be synthesized by the method described in JP2007-277514A.

<Curable Composition for Forming Binder of Fluorescent Region>

In the present invention, the curable composition forming a binder of the fluorescent region preferably contains a polymerizable compound.

(Polymerizable Compound)

The polymerizable compound is preferably an acrylic compound. A monofunctional or polyfunctional (meth)acrylate monomer is preferable, and a prepolymer or polymer of a monomer may be used as long as it has polymerizability. In the present specification, the term "(meth)acrylate" refers to one or both of acrylate and methacrylate. The same applies to the term "(meth)acryloyl" or the like.

—Monofunctional Ones—

A monofunctional (meth)acrylate monomer may be, for example, acrylic acid or methacrylic acid, or derivatives thereof, more specifically, a monomer having one polymerizable unsaturated bond ((meth)acryloyl group) of (meth)acrylic acid in the molecule. Specific examples thereof include the following compounds, but the present embodiment is not limited thereto.

Examples thereof include alkyl (meth)acrylates having 1 to 30 carbon atoms in the alkyl group, such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; aralkyl (meth)acrylates having 7 to 20 carbon atoms in the aralkyl group, such as benzyl (meth)acrylate; alkoxyalkyl (meth)acrylates having 2 to 30 carbon atoms in the alkoxyalkyl group, such as butoxyethyl (meth)acrylate; aminoalkyl (meth)acrylates having 1 to 20 carbon atoms in total in the (monoalkyl or dialkyl)aminoalkyl group, such as N,N-dimethylaminoethyl (meth)acrylate; polyalkylene glycol alkyl ether (meth)acrylates having 1 to 10 carbon atoms in the alkylene chain and having 1 to 10 carbon atoms in the terminal alkyl ether, such as diethylene glycol ethyl ether (meth)acrylate, triethylene glycol butyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate, and tetraethylene glycol monoethyl ether (meth)acrylate; polyalkylene glycol aryl ether (meth)acrylates having 1 to 30 carbon atoms in the alkylene chain and having 6 to 20 carbon atoms in the terminal aryl ether, such as hexaethylene glycol phenyl ether (meth)acrylate; (meth)acrylates having an alicyclic structure and having 4 to 30 carbon atoms in total, such as cyclohexyl (meth)acrylate, dicyclopentanyl (meth)acrylate, isobornyl (meth)acrylate, and methylene oxide addition cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, triethylene glycol mono (meth)acrylate, tetraethylene glycol mono(meth)acrylate, hexaethylene glycol mono(meth)acrylate, octapropylene glycol mono(meth)acrylate, and glycerol mono or di(meth) acrylate; (meth)acrylates having a glycidyl group, such as glycidyl (meth)acrylate; polyethylene glycol mono(meth) acrylates having 1 to 30 carbon atoms in the alkylene chain, such as tetraethylene glycol mono(meth)acrylate, hexaethylene glycol mono(meth)acrylate, and octapropylene glycol mono(meth)acrylate; and (meth)acrylamides such as (meth) acrylamide, N,N-dimethyl (meth)acrylamide, N-isopropyl (meth)acrylamide, 2-hydroxyethyl (meth)acrylamide, and acryloylmorpholine.

The amount of the monofunctional (meth)acrylate monomer to be used is preferably 10 parts by mass or more and more preferably 10 to 80 parts by mass with respect to 100 parts by mass of the total amount of the polymerizable compound contained in the coating liquid, from the viewpoint of adjusting the viscosity of the coating liquid to a preferable range.

—Difunctional Ones—

The polymerizable monomer having two polymerizable groups may be, for example, a difunctional polymerizable unsaturated monomer having two ethylenically unsaturated bond-containing groups. The difunctional polymerizable unsaturated monomer is suitable for allowing a composition to have a low viscosity. In the present embodiment, preferred is a (meth)acrylate-based compound which is excellent in reactivity and which has no problems associated with a remaining catalyst and the like.

In particular, neopentyl glycol di(meth)acrylate, 1,9-nonanediol di(meth)acrylate, dipropylene glycol di(meth) acrylate, tripropylene glycol di(meth)acrylate, tetraethylene glycol di(meth)acrylate, hydroxypivalate neopentyl glycol di(meth)acrylate, polyethylene glycol di(meth)acrylate, dicyclopentenyl(meth)acrylate, dicyclopentenyl oxyethyl (meth)acrylate, dicyclopentanyl di(meth)acrylate, or the like is suitably used in the present invention.

The amount of the difunctional (meth)acrylate monomer to be used is preferably 5 parts by mass or more and more preferably 10 to 80 parts by mass with respect to 100 parts by mass of the total amount of the polymerizable compound contained in the coating liquid, from the viewpoint of adjusting the viscosity of the coating liquid to a preferable range.

—Tri- or Higher Functional Ones—

The polymerizable monomer having three or more polymerizable groups may be, for example, a polyfunctional polymerizable unsaturated monomer having three or more ethylenically unsaturated bond-containing groups. Such a polyfunctional polymerizable unsaturated monomer is excellent in terms of imparting mechanical strength. In the present embodiment, preferred is a (meth)acrylate-based compound which is excellent in reactivity and which has no problems associated with a remaining catalyst and the like.

Specifically, epichlorohydrin (ECH)-modified glycerol tri(meth)acrylate, ethylene oxide (EO)-modified glycerol tri(meth)acrylate, propylene oxide (PO)-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, pentaerythritol tetra(meth)acrylate, or the like is suitable.

Among them, EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, dipentaerythritol penta(meth)acrylate, pentacrythritolethoxy tetra(meth)acrylate, or pentaerythritol tetra(meth)acrylate is particularly suitably used in the present invention.

The amount of the polyfunctional (meth)acrylate monomer to be used is preferably 5 parts by mass or more from the viewpoint of the coating film hardness of the wavelength conversion layer after curing, and preferably 95 parts by mass or less from the viewpoint of suppressing gelation of the coating liquid, with respect to 100 parts by mass of the total amount of the polymerizable compound contained in the coating liquid.

From the viewpoint of further improving the heat resistance of the fluorescent region (binder), the (meth)acrylate monomer is preferably an alicyclic acrylate. Examples of such a monofunctional (meth)acrylate monomer include dicyclopentenyl (meth)acrylate, dicyclopentanyl (meth)acrylate, and dicyclopentenyloxyethyl (meth)acrylate. Examples of the difunctional (meth)acrylate monomer include tricyclodecanedimethanol di(meth)acrylate.

The total amount of the polymerizable compound in the curable composition forming a binder is preferably 70 to 99 parts by mass and more preferably 85 to 97 parts by mass with respect to 100 parts by mass of the curable composition, from the viewpoint of handleability and curability of the composition.

—Epoxy-based Compounds and Others—

The polymerizable monomer may be, for example, a compound having a cyclic group such as a ring-opening polymerizable cyclic ether group such as an epoxy group or an oxetanyl group. Such a compound may be more preferably, for example, a compound (epoxy compound) having an epoxy group. Use of the compound having an epoxy group or an oxetanyl group in combination with the (meth)acrylate-based compound tends to improve adhesiveness to the substrate film.

Examples of the compound having an epoxy group include polyglycidyl esters of polybasic acids, polyglycidyl ethers of polyhydric alcohols, polyglycidyl ethers of polyoxyalkylene glycols, polyglycidyl ethers of aromatic polyols, hydrogenated compounds of polyglycidyl ethers of aromatic polyols, urethane polyepoxy compounds, and epoxidized polybutadienes. These compounds may be used alone or in admixture of two or more thereof.

Examples of other compounds having an epoxy group, which may be preferably used, include aliphatic cyclic epoxy compounds, bisphenol A diglycidyl ethers, bisphenol F diglycidyl ethers, bisphenol S diglycidyl ethers, brominated bisphenol A diglycidyl ethers, brominated bisphenol F diglycidyl ethers, brominated bisphenol S diglycidyl ethers, hydrogenated bisphenol A diglycidyl ethers, hydrogenated bisphenol F diglycidyl ethers, hydrogenated bisphenol S diglycidyl ethers, 1,4-butanediol diglycidyl ethers, 1,6-hexanediol diglycidyl ethers, glycerin triglycidyl ethers, trimethylolpropane triglycidyl ethers, polyethylene glycol diglycidyl ethers, and polypropylene glycol diglycidyl ethers; polyglycidyl ethers of polyether polyols, obtained by adding one or two or more alkylene oxides to an aliphatic polyhydric alcohol such as ethylene glycol, propylene glycol, or glycerin; diglycidyl esters of aliphatic long chain dibasic acids; monoglycidyl ethers of aliphatic higher alcohols; monoglycidyl ethers of polyether alcohols, obtained by adding an alkylene oxide to phenol, cresol, butyl phenol, or these compounds; and glycidyl esters of higher fatty acids.

Among these components, aliphatic cyclic epoxy compounds, bisphenol A diglycidyl ethers, bisphenol F diglycidyl ethers, hydrogenated bisphenol A diglycidyl ethers, hydrogenated bisphenol F diglycidyl ethers, 1,4-butanediol diglycidyl ethers, 1,6-hexanediol diglycidyl ethers, glycerin triglycidyl ethers, trimethylolpropane triglycidyl ethers, neopentyl glycol diglycidyl ethers, polyethylene glycol diglycidyl ethers, and polypropylene glycol diglycidyl ethers are preferable.

Examples of commercially available products which can be suitably used as the compound having an epoxy group or an oxetanyl group include UVR-6216 (manufactured by Union Carbide Corporation), glycidol, AOEX24, CYCLOMER A200, CELLOXIDE 2021P and CELLOXIDE 8000 (all manufactured by Daicel Corporation), 4-vinylcyclohexene dioxide manufactured by Sigma-Aldrich Co. LLC., EPIKOTE 828, EPIKOTE 812, EPIKOTE 1031, EPIKOTE 872 and EPIKOTE CT508 (all manufactured by Yuka Shell Epoxy K.K.), and KRM-2400, KRM-2410, KRM-2408, KRM-2490, KRM-2720 and KRM-2750 (all manufactured by Asahi Denka Kogyo K.K.). These compounds may be used alone or in combination of two or more thereof.

Although there are no particular restrictions on the production method of such a compound having an epoxy group or an oxetanyl group, the compound can be synthesized with reference to, for example, Literatures such as Fourth Edition Experimental Chemistry Course 20 Organic Synthesis II, from p. 213, 1992, published by Maruzen KK; Ed. by Alfred Hasfner, The chemistry of heterocyclic compounds-Small Ring Heterocycles part 3 Oxiranes, John & Wiley and Sons, An Interscience Publication, New York, 1985, Yoshimura, Adhesion, vol. 29, No. 12, 32, 1985, Yoshimura, Adhesion, vol. 30, No. 5, 42, 1986, Yoshimura, Adhesion, vol. 30, No. 7, 42, 1986, JP1999-100378A (JP-Hll-100378A), JP2906245B, and JP2926262B.

A vinyl ether compound may be used as the polymerizable compound.

A known vinyl ether compound can be appropriately selected as the vinyl ether compound. For example, the compounds described in paragraph [0057] of JP2009-073078A may be preferably adopted.

Such a vinyl ether compound can be synthesized by, for example, the method described in Stephen. C. Lapin, Polymers Paint Colour Journal. 179 (4237), 321 (1988), namely, by a reaction of a polyhydric alcohol or a polyhydric phenol with acetylene, or a reaction of a polyhydric alcohol or a polyhydric phenol with a halogenated alkyl vinyl ether, and such method and reactions may be used alone or in combination of two or more thereof.

A silsesquioxane compound having a reactive group described in JP2009-073078A can also be used in the coating liquid, from the viewpoint of a decrease in viscosity and an increase in hardness.

The polymerizable compound contained in the curable composition for forming the binder of the fluorescent region is particularly preferably a (meth)acrylate-based compound, an epoxy-based compound, or the like.

Among the foregoing polymerizable compounds, a (meth) acrylate compound is preferable from the viewpoint of composition viscosity and photocurability, and acrylate is more preferable. In the present invention, a polyfunctional polymerizable compound having two or more polymerizable functional groups is preferable. In the present invention, particularly, the compounding ratio of the monofunctional (meth)acrylate compound to the polyfunctional (meth)acrylate compound is preferably 80/20 to 0/100, more preferably 70/30 to 0/100, and still more preferably 40/60 to 0/100 in terms of weight ratio. By selecting an appropriate ratio, it is possible to provide sufficient curability and make the composition low in viscosity.

The ratio of the difunctional (meth)acrylate to the tri- or higher functional (meth)acrylate in the polyfunctional (meth)acrylate compound is preferably 100/0 to 20/80, more preferably 100/0 to 50/50, and still more preferably 100/0 to 70/30 in terms of mass ratio. Since the tri- or higher functional (meth)acrylate has a higher viscosity than the difunctional (meth)acrylate, a larger amount of the difunctional (meth)acrylate is preferable because the viscosity of the curable composition for forming the binder of the fluorescent region in the present invention can be lowered.

It is also preferred to include a compound containing a substituent having an aromatic structure and/or an alicyclic hydrocarbon structure as the polymerizable compound. The polymerizable compound having an aromatic structure and/or an alicyclic hydrocarbon structure in the component is more preferably contained in an amount of 50% by mass or more and still more preferably 80% by mass or more. The polymerizable compound having an aromatic structure is preferably a (meth)acrylate compound having an aromatic structure. As the (meth)acrylate compound having an aromatic structure, a monofunctional (meth)acrylate compound having a naphthalene structure, such as 1- or 2-naphthyl (meth)acrylate, 1- or 2-naphthylmethyl (meth)acrylate, or 1- or 2-naphthylethyl (meth)acrylate, a monofunctional acrylate having a substituent on the aromatic ring, such as benzyl acrylate, and a difunctional acrylate such as catechol diacrylate or xylylene glycol diacrylate are particularly preferable. As the polymerizable compound having an alicyclic hydrocarbon structure, isobornyl (meth)acrylate, dicyclopentanyl (meth)acrylate, dicyclopentanyloxyethyl (meth) acrylate, dicyclopentenyl (meth)acrylate, adamantyl (meth) acrylate, tricyclodecanyl (meth)acrylate, tetracyclododecanyl (meth)acrylate, and the like are preferable.

In addition, in a case where (meth)acrylate is used as the polymerizable compound, acrylate is preferable to methacrylate from the viewpoint of excellent curability.

<Thixotropic Agent>

The curable composition may contain a thixotropic agent.

The thixotropic agent is an inorganic compound or an organic compound.

—Inorganic Compound—

One preferred aspect of the thixotropic agent is a thixotropic agent of an inorganic compound, and, for example, a needle-like compound, a chain-like compound, a flattened compound, or a layered compound can be preferably used. Among them, a layered compound is preferable.

The layered compound is not particularly limited and examples thereof include talc, mica, feldspar, kaolinite (kaolin clay), pyrophyllite (pyrophyllite clay), sericite (silk mica), bentonite, smectite-vermiculites (montmorillonite, beidellite, non-tronite, saponite, and the like), organic bentonite, and organic smectite.

These compounds may be used alone or in combination of two or more thereof.

Examples of commercially available layered compounds include, as inorganic compounds, CROWN CLAY, BURGESS CLAY #60, BURGESS CLAY KF, and OPTIWHITE (all manufactured by Shiraishi Kogyo Kaisha Ltd.), KAOLIN JP-100, NN KAOLIN CLAY, ST KAOLIN CLAY, and HARDSEAL (all manufactured by Tsuchiya Kaolin Ind., Ltd.), ASP-072, SATINTONPLUS, TRANSLINK 37, and HYDROUSDELAMI NCD (all manufactured by Angel Hard Corporation), SY KAOLIN, OS CLAY, HA CLAY, and MC HARD CLAY (all manufactured by Maruo Calcium Co., Ltd.), RUCENTITE SWN, RUCENTITE SAN, RUCENTITE STN, RUCENTITE SEN, and RUCENTITE SPN (all manufactured by Co-op Chemical Co., Ltd.), SUMECTON (manufactured by Kunimine Industries Co., Ltd.), BENGEL, BENGEL FW, ESBEN, ESBEN 74, ORGANITE, and ORGANITE T (all manufactured by Hojun Co., Ltd.), HODAKA JIRUSHI, ORBEN, 250M, BENTONE 34, and BENTONE 38 (all manufactured by Wilbur-Ellis Company), and LAPONITE, LAPONITE RD, and LAPONITE RDS (all manufactured by Nippon Silica Industrial Co., Ltd.). These compounds may also be dispersed in a solvent.

The thixotropic agent to be added to the coating liquid is preferably, among layered inorganic compounds, a silicate compound represented by $xM(I)_2O \cdot ySiO_2$ (also including a compound corresponding to $M(II)O$ or $M(III)_2O_3$ having an oxidation number of 2 or 3; x and y represent a positive number), and a further preferred compound is a swellable layered clay mineral such as hectorite, bentonite, smectite, or vermiculite.

Particularly preferably, a layered (clay) compound modified with an organic cation (a compound in which an interlayer cation such as sodium in a silicate compound is exchanged with an organic cation compound) can be suitably used, and examples thereof include compounds in which a sodium ion in sodium magnesium silicate (hectorite) is exchanged with an ammonium ion which will be described below.

Examples of the ammonium ion include a monoalkyltrimethylammonium ion, a dialkyldimethylammonium ion, and a trialkylmethylammonium ion, each having an alkyl chain having 6 to 18 carbon atoms, a dipolyoxyethylene-palm oil-alkylmethylammonium ion and a bis(2-hydroxyethyl)-palm oil-alkylmethylammonium ion, each having 4 to 18 oxyethylene chains, and a polyoxypropylene methyldiethylammonium ion having 4 to 25 oxypropylene chains. These ammonium ions may be used alone or in combination of two or more thereof.

The method for producing an organic cation-modified silicate mineral in which a sodium ion of sodium magnesium silicate is exchanged with an ammonium ion is as follows: sodium magnesium silicate is dispersed in water and sufficiently stirred, and thereafter allowed to stand for 16 hours or more to prepare a 4% by mass dispersion liquid; while this dispersion liquid is stirred, a desired ammonium salt is added in an amount of 30% by mass to 200% by mass relative to sodium magnesium silicate; after the addition, cation exchange takes place, and hectorite containing an ammonium salt between the layers becomes insoluble in water and precipitates, and therefore the precipitate is collected by filtration and dried. In the preparation, heating may also be carried out for the purpose of accelerating the dispersion.

Examples of commercially available products of the alkylammonium-modified silicate mineral include RUCENTITE SAN, RUCENTITE SAN-316, RUCENTITE STN, RUCENTITE SEN, and RUCENTITE SPN (all manufactured by Co-op Chemical Co., Ltd.), which may be used alone or in combination of two or more thereof.

In the present embodiment, silica, alumina, silicon nitride, titanium dioxide, calcium carbonate, zinc oxide, or the like can be used as the thixotropic agent of an inorganic compound. These compounds may also be subjected to a treatment to adjust hydrophilicity or hydrophobicity on the surface, as necessary.

—Organic Compound—

For the thixotropic agent, a thixotropic agent of an organic compound can be used.

Examples of the thixotropic agent of an organic compound include oxidized polyolefin and modified urea.

The above-mentioned oxidized polyolefin may be prepared in-house or may be a commercially available product. Examples of commercially available products include DISPARLON 4200-20 (trade name, manufactured by Kusumoto Chemicals, Ltd.) and FLOWNON SA300 (trade name, manufactured by Kyoeisha Chemical Co., Ltd.).

The above-mentioned modified urea is a reaction product of an isocyanate monomer or an adduct thereof with an organic amine. The above-mentioned modified urea may be prepared in-house or may be a commercially available product. The commercially available product may be, for example, BYK 410 (manufactured by BYK).

—Content—

The content of the thixotropic agent in the coating liquid is preferably 0.15 to 20 parts by mass, more preferably 0.2 to 10 parts by mass, and particularly preferably 0.2 to 8 parts by mass, with respect to 100 parts by mass of the curable compound. In particular, in the case of the thixotropic agent of an inorganic compound, the content of 20 parts by mass or less with respect to 100 parts by mass of the curable compound tends to improve brittleness.

<Polymerization Initiator>

The coating liquid may contain a known polymerization initiator as a polymerization initiator. With respect to the polymerization initiator, for example, reference can be made to paragraph [0037] of JP2013-043382A. The polymerization initiator is preferably in an amount of 0.1% by mol or more and more preferably 0.5% to 2% by mol based on the total amount of the polymerizable compound contained in the coating liquid. In addition, the polymerization initiator is preferably contained in an amount of 0.1% by mass to 10% by mass and more preferably 0.2% by mass to 8% by mass, as the percentage by mass in the total curable composition excluding the volatile organic solvent.

—Photopolymerization Initiator—

The curable composition preferably contains a photopolymerization initiator. Any photopolymerization initiator may be used as long as it is a compound capable of generating an active species that polymerizes the polymerizable compound upon photo-irradiation. Examples of the photopolymerization initiator include a cationic polymerization initiator and a radical polymerization initiator, among which a radical polymerization initiator is preferable. Further, in the present invention, a plurality of photopolymerization initiators may be used in combination.

The content of the photopolymerization initiator is, for example, 0.01% to 15% by mass, preferably 0.1% to 12% by mass, and more preferably 0.2% to 7% by mass, in the total composition excluding the solvent. In a case where two or more photopolymerization initiators are used, the total amount thereof falls within the above range.

In a case where the content of the photopolymerization initiator is 0.01% by mass or more, sensitivity (fast curability) and coating film hardness tend to improve, which is preferable. On the other hand, in a case where the content of the photopolymerization initiator is 15% by mass or less, light transmittance, colorability, handleability, and the like tend to improve, which is preferable. In a system including a dye and/or a pigment, they may act as a radical trapping agent and affect photopolymerizability and sensitivity. In consideration of this point, in these applications, the addition amount of the photopolymerization initiator is optimized. On the other hand, in the composition used in the present invention, the dye and/or pigment is not an essential component, and the optimum range of the photopolymerization initiator may be different from that in the field of a curable composition for liquid crystal display color filter, or the like.

For example, a commercially available initiator can be used as the radical photopolymerization initiator. The examples thereof include those described, for example, in paragraph [0091] of JP2008-105414A, which are preferably used. Among them, an acetophenone-based compound, an acylphosphine oxide-based compound, and an oxime ester-based compound are preferable from the viewpoint of curing sensitivity and absorption properties.

The acetophenone-based compound may be preferably, for example, a hydroxyacetophenone-based compound, a dialkoxyacetophenone-based compound, and an aminoacetophenone-based compound. The hydroxyacetophenone-based compound may be preferably, for example, IRGACURE (registered trademark) 2959 (1-[4-(2-hydroxyethoxy)phenyl]-2-hydroxy-2-methyl-1-propan-1-one), IRGACURE (registered trademark) 184 (1-hydroxycyclohexyl phenylketone), IRGACURE (registered trademark) 500 (1-hydroxycyclohexyl phenylketone, benzophenone), and Darocur (registered trademark) 1173 (2-hydroxy-2-methyl-1-phenyl-1-propan-1-one), all of which are commercially available from BASF Corporation. The dialkoxyacetophenone-based compound may be preferably, for example, IRGACURE (registered trademark) 651 (2,2-dimethoxy-1,2-diphenylethan-1-one) which is commercially available from BASF Corporation.

The aminoacetophenone-based compound may be preferably, for example, IRGACURE (registered trademark) 369 (2-benzyl-2-dimethylamino-1-(4-morpholinophenyl)butanone-1), IRGACURE (registered trademark) 379 (EG) (2-dimethylamino-2-(4-methylbenzyl)-1-(4-morpholin-4-ylphenyl)butan-1-one), and IRGACURE (registered trademark) 907 (2-methyl-1-[4-methylthiophenyl]-2-morpholinopropan-1-one), all of which are commercially available from BASF Corporation.

The acylphosphine oxide-based compound may be preferably, for example, IRGACURE (registered trademark) 819 (bis(2,4,6-trimethylbenzoyl)-phenylphosphine oxide), and IRGACURE (registered trademark) 1800 (bis(2,6-dimethoxybenzoyl)-2,4,4-trimethyl-pentylphosphine oxide), all of which are commercially available from BASF Corporation, and Lucirin TPO (2,4,6-trimethylbenzoyldiphenylphosphine oxide) and Lucirin TPO-L (2,4,6-trimethylbenzoylphenylethoxyphosphine oxide), both of which are commercially available from BASF Corporation.

The oxime ester-based compound may be preferably, for example, IRGACURE (registered trademark) OXEOI (1,2-octanedione, 1-[4-(phenylthio)phenyl]-2-(O-benzoyloxime)), or IRGACURE (registered trademark) OXE02 (ethanone, 1-[9-ethyl-6-(2-methylbenzoyl)-9H-carbazol-3-yl]-, 1-(O-acetyloxime)), all of which are commercially available from BASF Corporation.

The cationic photopolymerization initiator is preferably a sulfonium salt compound, an iodonium salt compound, an oxime sulfonate compound, or the like, and examples thereof include 4-methylphenyl-4-(1-methylethyl)phenyliodonium tetrakis(pentafluorophenyl)borate (PI 2074 manufactured by Rhodia, Inc.), 4-methylphenyl-4-(2-methylpropyl)phenyliodonium hexafluorophosphate (IRGACURE 250 manufactured by BASF Corporation), and IRGACURE PAG103, 108, 121, and 203 (all manufactured by BASF Corporation).

The photopolymerization initiator needs to be selected appropriately with respect to the wavelength of the light source to be used, but it is preferred that the photopolymerization initiator does not generate gas during mold pressurization/exposure. In a case where gas is generated, the mold is contaminated, so it is necessary to frequently clean the mold, or the photocurable composition is deformed in the mold, which contributes to problems such as deterioration of transfer pattern accuracy.

The curable composition for forming the binder of the fluorescent region 35 is preferably a radically polymerizable curable composition in which the polymerizable compound is a radically polymerizable compound and the photopolymerization initiator is a radical polymerization initiator capable of generating radicals upon photo-irradiation.

(Polymer)

The curable composition forming a binder may contain a polymer. Examples of the polymer include poly(meth)acrylate, poly(meth)acrylamide, polyester, polyurethane, polyurea, polyamide, polyether, and polystyrene.

(Polymer Dispersant)

The curable composition forming a binder may contain a polymer dispersant for dispersing quantum dots in the binder.

The polymer dispersant has a coordinating group coordinating to the surface of the quantum dot, and is a compound represented by General Formula I.

The polymer dispersant having the structure of General Formula I is difficult to desorb due to multipoint adsorption and can impart high dispersibility. Further, since the adsorptive groups are densely packed at the terminals, crosslinking between particles is difficult, and increase in liquid viscosity causing bubble entrainment can be suppressed.

General Formula I $(A)_n\!-\!Z\!-\!(X^2\!-\!P)_m$
$(R^1\!-\!X^1)_l$

In General Formula I, A is an organic group having a coordinating group coordinating to a quantum dot, Z is an (n+m+1)-valent organic linking group, $X^1$ and $X^2$ are each a single bond or a divalent organic linking group, $R^1$ represents an optionally substituted alkyl group, alkenyl group or alkynyl group, and P is a group having a polymer chain containing at least one polymer skeleton selected from a polyacrylate skeleton, a polymethacrylate skeleton, a polyacrylamide skeleton, a polymethacrylamide skeleton, a polyester skeleton, a polyurethane skeleton, a polyurea skeleton, a polyamide skeleton, a polyether skeleton, a polyvinyl ether skeleton, or a polystyrene skeleton, each of which has a degree of polymerization of 3 or more. n and m are each independently a number of 1 or more, l is a number of 0 or more, and n+m+l is an integer of 2 or more and 10 or less. The (n) number of A's may be the same as or different from each other. The (m) number of P's may be the same as or different from each other. l pieces of $X^1$ and $R^1$ may be the same as or different from each other.

In General Formula I, $X^1$ and $X^2$ each represents a single bond or a divalent organic linking group. Examples of the divalent organic linking group include groups having 1 to 100 carbon atoms, 0 to 10 nitrogen atoms, 0 to 50 oxygen atoms, 1 to 200 hydrogen atoms, and 0 to 20 sulfur atoms, and the divalent organic linking group may be unsubstituted or may have a substituent.

The divalent organic linking groups $X^1$ and $X^2$ are each preferably a single bond or a divalent organic linking group having 1 to 50 carbon atoms, 0 to 8 nitrogen atoms, 0 to 25 oxygen atoms, 1 to 100 hydrogen atoms, and 0 to 10 sulfur atoms. A single bond or a divalent organic linking group having 1 to 30 carbon atoms, 0 to 6 nitrogen atoms, 0 to 15 oxygen atoms, 1 to 50 hydrogen atoms, and 0 to 7 sulfur atoms is more preferable. A single bond or a divalent organic linking group having 1 to 10 carbon atoms, 0 to 5 nitrogen atoms, 0 to 10 oxygen atoms, 1 to 30 hydrogen atoms, and 0 to 5 sulfur atoms is particularly preferable.

Specific examples of the divalent organic linking groups $X^1$ and $X^2$ include groups (which may form a ring structure) formed by combining the following structural units.

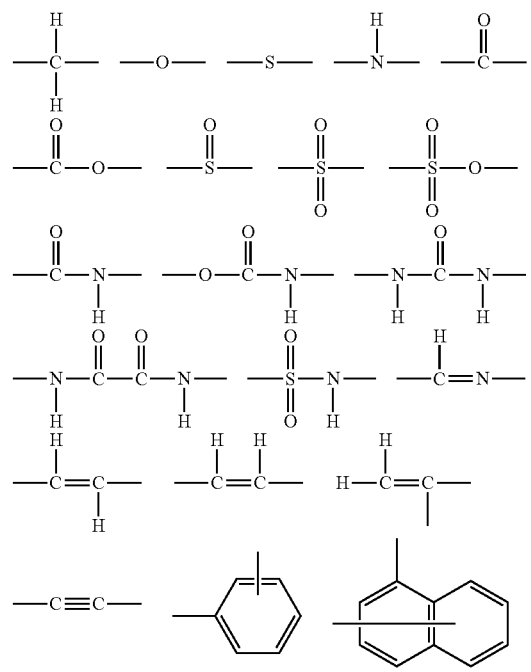

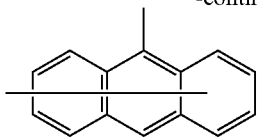

In a case where the divalent organic linking groups X¹ and X² have a substituent, examples of the substituent include an alkyl group having 1 to 20 carbon atoms such as a methyl group or an ethyl group; an aryl group having 6 to 16 carbon atoms such as a phenyl group or a naphthyl group; a hydroxyl group; an amino group; a carboxyl group; a sulfonamide group; an N-sulfonylamide group; an acyloxy group having 1 to 6 carbon atoms such as an acetoxy group; an alkoxy group having 1 to 6 carbon atoms such as a methoxy group or an ethoxy group; a halogen atom such as chlorine or bromine; an alkoxycarbonyl group having 2 to 7 carbon atoms such as a methoxycarbonyl group, an ethoxycarbonyl group or a cyclohexyloxycarbonyl group; a cyano group; and a carbonic acid ester group such as a t-butyl carbonate group.

Examples of the (n+m+1)-valent organic linking group represented by Z include groups having 1 to 100 carbon atoms, 0 to 10 nitrogen atoms, 0 to 50 oxygen atoms, 1 to 200 hydrogen atoms, and 0 to 20 sulfur atoms, and the (n+m+1)-valent organic linking group may be unsubstituted or may further have a substituent.

The (n+m+1)-valent organic linking group Z is preferably a group having 1 to 60 carbon atoms, 0 to 10 nitrogen atoms, 0 to 40 oxygen atoms, 1 to 120 hydrogen atoms, and 0 to 10 sulfur atoms, more preferably a group having 1 to 50 carbon atoms, 0 to 10 nitrogen atoms, 0 to 30 oxygen atoms, 1 to 100 hydrogen atoms, and 0 to 7 sulfur atoms, and particularly preferably a group having 1 to 40 carbon atoms, 0 to 8 nitrogen atoms, 0 to 20 oxygen atoms, 1 to 80 hydrogen atoms, and 0 to 5 sulfur atoms.

Examples of the (n+m+1)-valent organic linking group Z include groups (which may form a ring structure) formed by combining the following structural units or structural units.

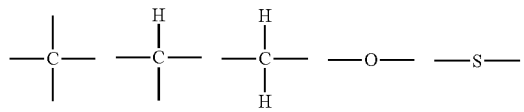

Specific examples (1) to (20) of the (n+m+1)-valent organic linking group Z are shown below. However, the present invention is not limited thereto. * in the following organic linking group indicates a site that binds to A, X¹, and X² in General Formula I.

(1)

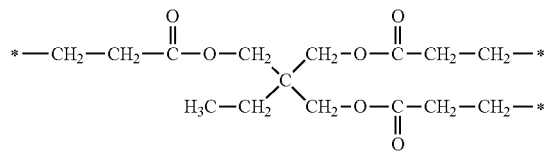

(2)

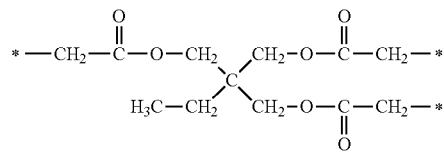

(3)

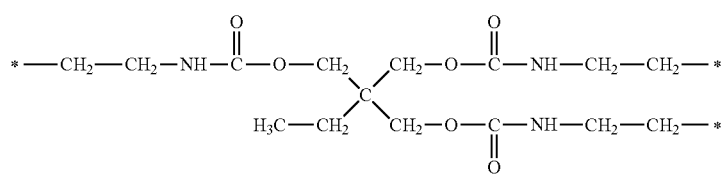

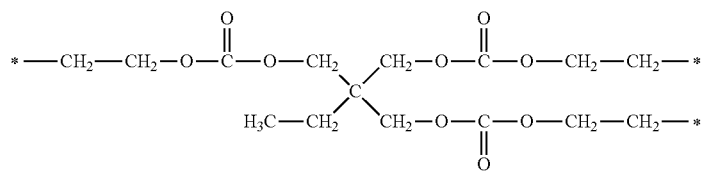
(4)
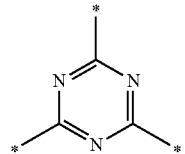
(5)
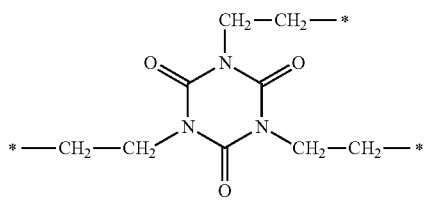
(6)
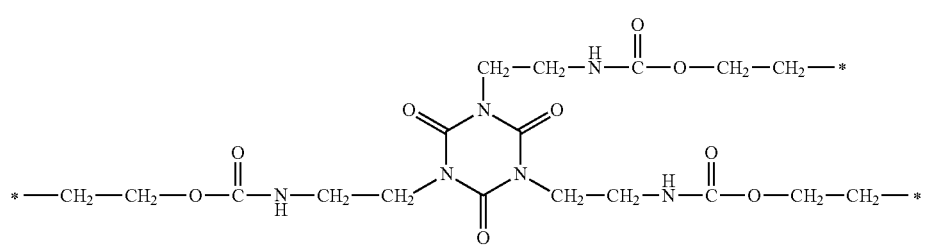
(7)
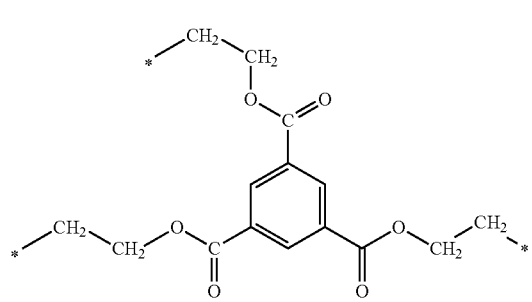
(8)
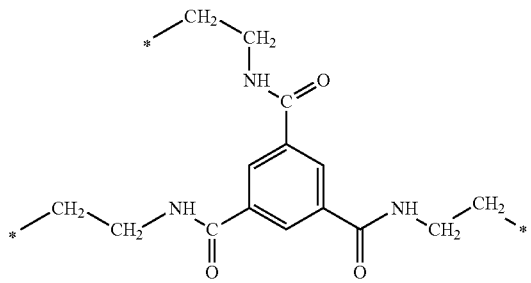
(9)
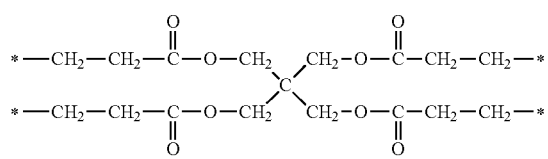
(10)
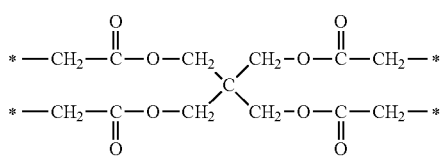
(11)
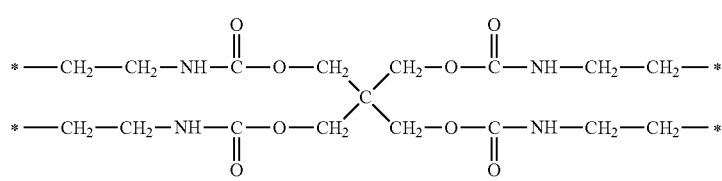
(12)
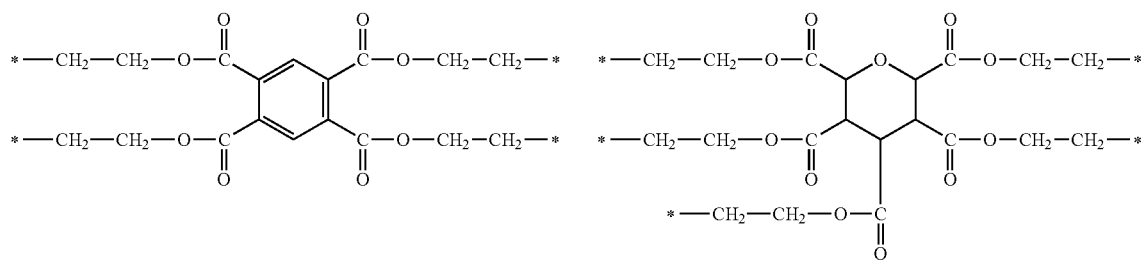
(13)
(14)

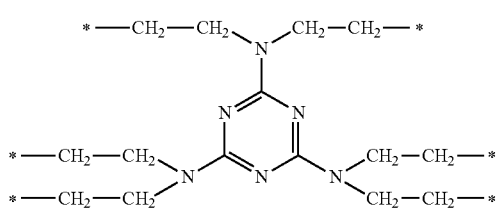
(15)

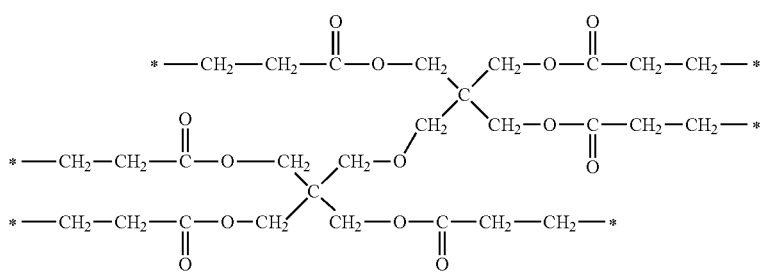
(16)

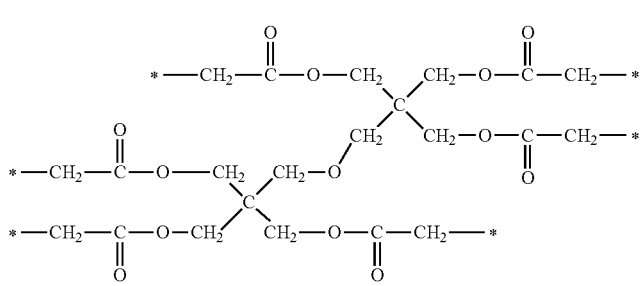
(17)

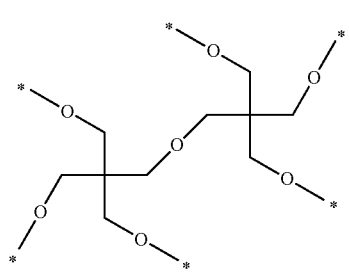
(18)

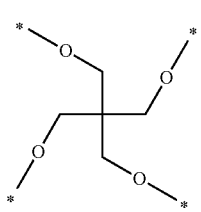
(19)

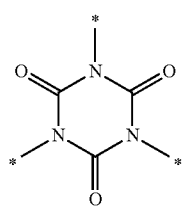
(20)

In a case where the (n+m+1)-valent organic linking group Z has a substituent, examples of the substituent include an alkyl group having 1 to 20 carbon atoms such as a methyl group or an ethyl group; an aryl group having 6 to 16 carbon atoms such as a phenyl group or a naphthyl group; a hydroxyl group; an amino group; a carboxyl group; a sulfonamide group; an N-sulfonylamide group; an acyloxy group having 1 to 6 carbon atoms such as an acetoxy group; an alkoxy group having 1 to 6 carbon atoms such as a methoxy group or an ethoxy group; a halogen atom such as chlorine or bromine; an alkoxycarbonyl group having 2 to 7 carbon atoms such as a methoxycarbonyl group, an ethoxycarbonyl group or a cyclohexyloxycarbonyl group; a cyano group; and a carbonic acid ester group such as a t-butyl carbonate group.

Among the above specific examples, the most preferable (n+m+1)-valent organic linking group Z is the following group from the viewpoints of availability of raw materials, ease of synthesis, monomers, and solubility in various solvents.

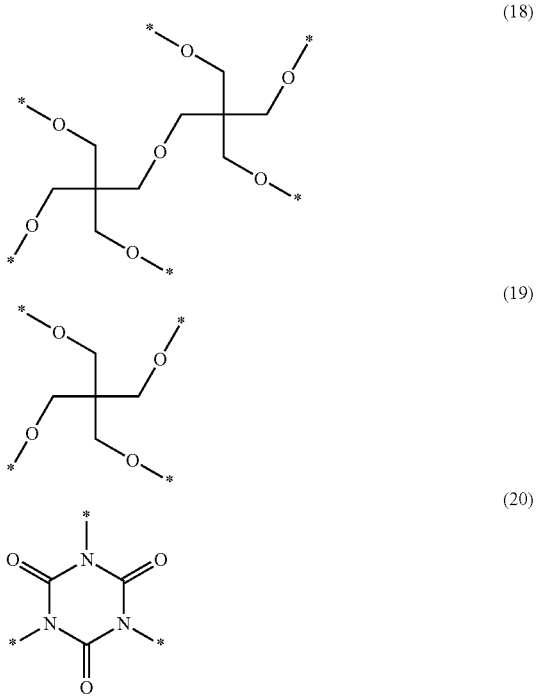

(18)

(19)

(20)

In General Formula I, $R^1$ is an alkyl group, alkenyl group, or alkynyl group which may have a substituent. The number of carbon atoms in the alkyl group, alkenyl group, or alkynyl group is preferably 1 to 30 and more preferably 1 to 20. Examples of the substituent include an alkyl group having 1 to 20 carbon atoms such as a methyl group or an ethyl group; an aryl group having 6 to 16 carbon atoms such as a phenyl group or a naphthyl group; a hydroxyl group; an amino group; a carboxyl group; a sulfonamide group; an N-sulfonylamide group; an acyloxy group having 1 to 6 carbon atoms such as an acetoxy group; an alkoxy group having 1 to 6 carbon atoms such as a methoxy group or an ethoxy group: a halogen atom such as chlorine or bromine; an alkoxycarbonyl group having 2 to 7 carbon atoms such as a methoxycarbonyl group, an ethoxycarbonyl group or a cyclohexyloxycarbonyl group; a cyano group; and a carbonic acid ester group such as a t-butyl carbonate group.

The polymer chain P in the present invention is a polymer chain containing at least one polymer skeleton selected from a polyacrylate skeleton, a polymethacrylate skeleton, a polyacrylamide skeleton, a polymethacrylamide skeleton, a polyester skeleton, a polyurethane skeleton, a polyurea skeleton, a polyamide skeleton, a polyether skeleton, a polyvinyl ether skeleton, or a polystyrene skeleton, each of which has a degree of polymerization of 3 or more, and also includes a polymer, a modified product, or a copolymer having these polymer skeletons. For example, a polyether/polyurethane copolymer, or a copolymer of polyether/vinyl monomer can be mentioned. Further, the polymer chain may be any of a random copolymer, a block copolymer, and a graft copolymer. Among them, a polymer or copolymer including a polyacrylate skeleton is particularly preferable.

Further, it is preferred that the polymer chain P is soluble in a solvent. In a case where the affinity with the solvent is low, for example, in a case where it is used as a ligand, the affinity with a dispersion medium is weakened, and an adsorption layer sufficient for dispersion stabilization cannot be secured in some cases.

The monomer forming the polymer chain P is not particularly limited, but preferred examples thereof include (meth)acrylic acid esters, crotonic acid esters, vinyl esters, maleic acid diesters, fumaric acid diesters, itaconic acid diesters, aliphatic polyesters, (meth)acrylamides, aliphatic polyamide styrenes, vinyl ethers, vinyl ketones, olefins, maleimides, (meth)acrylonitriles, and monomers having an acidic group. Preferred examples of these monomers will be described below.

Examples of (meth)acrylic acid esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 2-methoxyethyl (meth)acrylate, 2-ethoxyethyl (meth)acrylate, 2-(2-methoxyethoxy)ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-aryloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, and γ-butyrolactone (meth)acrylate.

Examples of crotonic acid esters include butyl crotonate and hexyl crotonate.

Examples of vinyl esters include vinyl acetate, vinyl chloroacetate, vinyl propionate, vinyl butyrate, vinyl methoxyacetate, and vinyl benzoate.

Examples of maleic acid diesters include dimethyl maleate, diethyl maleate, and dibutyl maleate.

Examples of fumaric acid diesters include dimethyl fumarate, diethyl fumarate, and dibutyl fumarate.

Examples of itaconic acid diesters include dimethyl itaconate, diethyl itaconate, and dibutyl itaconate.

Examples of aliphatic polyesters include polycaprolactone and polyvalerolactone.

Examples of (meth)acrylamides include (meth)acrylamide, N-methyl (meth)acrylamide, N-ethyl (meth)acrylamide, N-propyl (meth)acrylamide, N-isopropyl (meth)acrylamide, N-n-butyl (meth)acrylamide, N-t-butyl (meth)acrylamide, N-cyclohexyl (meth)acrylamide, N-(2-methoxyethyl) (meth)acrylamide, N,N-dimethyl (meth)acrylamide, N,N-diethyl (meth)acrylamide, N-phenyl (meth)acrylamide, N-nitrophenyl acrylamide, N-ethyl-N-phenyl acrylamide, N-benzyl (meth)acrylamide, (meth)acryloyl morpholine, diacetone acrylamide, N-methylol acrylamide, N-hydroxyethyl acrylamide, vinyl (meth)acrylamide, N,N-diallyl (meth)acrylamide, and N-allyl (meth)acrylamide.

Examples of aliphatic polyamides include polycaprolactam and polyvalerolactam.

Examples of styrenes include styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethyl styrene, hydroxystyrene protected with a group that can be deprotected with an acidic substance (such as t-Boc), methyl vinylbenzoate, and α-methylstyrene.

Examples of vinyl ethers include methyl vinyl ether, ethyl vinyl ether, 2-chloroethyl vinyl ether, hydroxyethyl vinyl ether, propyl vinyl ether, butyl vinyl ether, hexyl vinyl ether, octyl vinyl ether, methoxyethyl vinyl ether, and phenyl vinyl ether.

Examples of vinyl ketones include methyl vinyl ketone, ethyl vinyl ketone, propyl vinyl ketone, and phenyl vinyl ketone.

Examples of olefins include ethylene, propylene, isobutylene, butadiene, and isoprene.

Examples of maleimides include maleimide, butylmaleimide, cyclohexylmaleimide, and phenylmaleimide.

(Meth)acrylonitrile, a heterocyclic group substituted with a vinyl group (for example, vinylpyridine, N-vinylpyrrolidone, or vinylcarbazole), N-vinylformamide, N-vinylacetamide, N-vinylimidazole, vinylcaprolactone, and the like can also be used.

The polymer chain P is also preferably a group represented by General Formula P1.

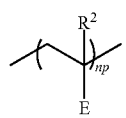

General Formula P1

In General Formula P1, E is a substituent including at least one of —O—, —CO—, —COO—, —COOR$^y$, an epoxy group, an oxetanyl group, an alicyclic epoxy group, an alkylene group, an alkyl group, or an alkenyl group, R$^y$ is a hydrogen atom or an alkyl group having 1 to 6 carbon atoms, and R$^2$ is a hydrogen atom or an alkyl group having 1 to 6 carbon atoms. np is a number of 3 to 500. A plurality of E's and R$^2$'s each may be the same as or different from each other.

As the polymer chain represented by General Formula P1, the following polymer chains can be mentioned.

np is preferably 3 to 500, more preferably 4 to 200, and still more preferably 5 to 100.

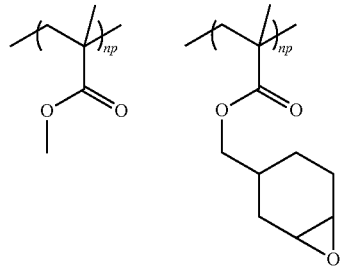

The polymer dispersant may further be a compound represented by General Formula II in which n and m are 1, and l is 0 in General Formula I.

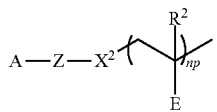

General Formula II

A is preferably a group represented by General Formula A1.

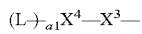

General Formula A1

In General Formula A1, $X^3$ is a single bond or a divalent organic linking group, $X^4$ is an (a1+1)-valent organic linking group, L is a coordinating group, and a1 is an integer of 1 or more and 2 or less. $X^3$ has the same definition as $X^2$ in General Formula I, and the preferred range thereof is also the same.

The (a1+1)-valent organic linking group $X^4$ is preferably a group having 1 to 60 carbon atoms, 0 to 10 nitrogen atoms, 0 to 40 oxygen atoms, 1 to 120 hydrogen atoms, and 0 to 10 sulfur atoms, more preferably a group having 1 to 50 carbon atoms, 0 to 10 nitrogen atoms, 0 to 30 oxygen atoms, 1 to 100 hydrogen atoms, and 0 to 7 sulfur atoms, and particularly preferably a group having 1 to 40 carbon atoms, 0 to 8 nitrogen atoms, 0 to 20 oxygen atoms, 1 to 80 hydrogen atoms, and 0 to 5 sulfur atoms.

Specific examples of the (a1+1)-valent organic linking group $X^4$ include groups (which may form a ring structure) formed by combining the following structural units or structural units.

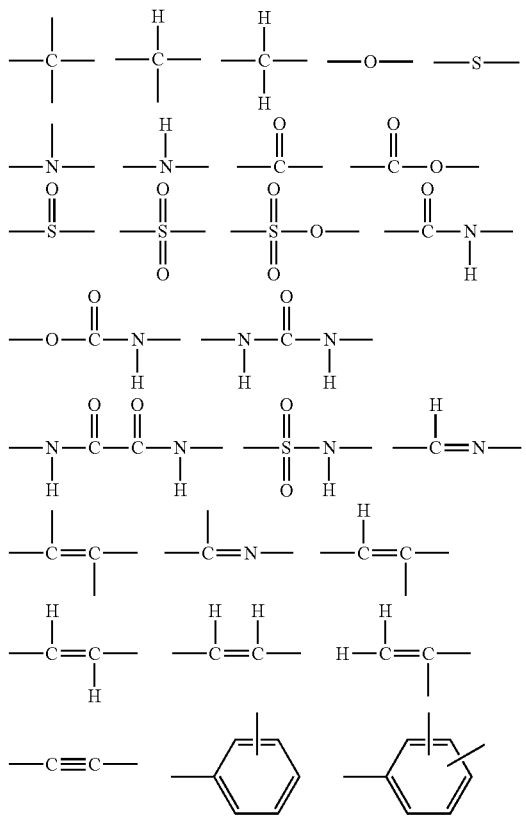

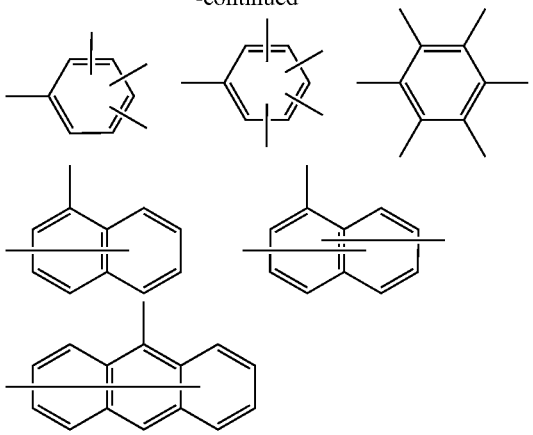

In a case where the (a1+1)-valent organic linking group $X^4$ has a substituent, examples of the substituent include an alkyl group having 1 to 20 carbon atoms such as a methyl group or an ethyl group; an aryl group having 6 to 16 carbon atoms such as a phenyl group or a naphthyl group; a hydroxyl group; an amino group; a carboxyl group; a sulfonamide group; an N-sulfonylamide group; an acyloxy group having 1 to 6 carbon atoms such as an acetoxy group; an alkoxy group having 1 to 6 carbon atoms such as a methoxy group or an ethoxy group; a halogen atom such as chlorine or bromine; an alkoxycarbonyl group having 2 to 7 carbon atoms such as a methoxycarbonyl group, an ethoxycarbonyl group or a cyclohexyloxycarbonyl group; a cyano group; and a carbonic acid ester group such as a t-butyl carbonate group.

The coordinating group L is preferably at least one selected from an amino group, a carboxy group, a mercapto group, a phosphine group, or a phosphine oxide group. Among them, a carboxy group and a phosphine oxide group are more preferable.

In General Formula A1, the group containing the coordinating group L and the divalent organic linking group $X^4$ is preferably the following group. In the following groups, * indicates a site that binds to $X^3$.

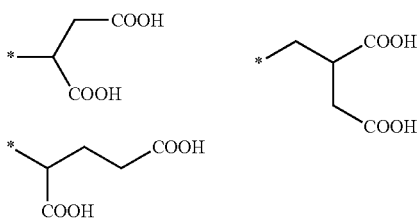

Such $X^4$ is shorter than about 1 nm in length and has a plurality of coordinating groups in the range of this length. For this reason, the ligands are strongly coordinated since the ligands can adsorb onto the quantum dot in a denser state at multiple points. As a result, the ligands cover the surface of the quantum dots without being detached, thus preventing surface level formation on the surface of the quantum dots, oxidation of the quantum dots, and aggregation of the quantum dots, whereby it is possible to suppress the deterioration of luminous efficiency. In addition, even in a case where the ligands are already coordinated to the quantum dots, the polymer dispersant can enter the interstices of the ligands, and furthermore, the decrease in the luminous efficiency of the quantum dots can be suppressed.

The polymer dispersant may be a compound represented by General Formula III.

General Formula III

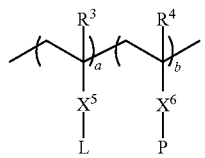

In General Formula III, $X^5$ and $X^6$ are each a single bond or a divalent organic linking group, $R^3$ and $R^4$ are each a hydrogen atom or an alkyl group having 1 to 6 carbon atoms, P is a group having a polymer chain containing at least one polymer skeleton selected from a polyacrylate skeleton, a polymethacrylate skeleton, a polyacrylamide skeleton, a polymethacrylamide skeleton, a polyester skeleton, a polyurethane skeleton, a polyurea skeleton, a polyamide skeleton, a polyether skeleton, a polyvinyl ether skeleton, or a polystyrene skeleton, each of which has a degree of polymerization of 3 or more. a and b are each independently a number of 1 or more, and a+b is 2 or more and 1,000 or less. A plurality of L's may be the same as or different from each other. A plurality of P's may be the same as or different from each other.

$X^5$ and $X^6$ are each a single bond or a divalent organic linking group. $X^5$ and $X^6$ as the divalent organic linking group have the same definition as in the divalent organic linking group $X^2$ in General Formula I. In particular, a group containing —COO—, —CONH—, —O—, or the like is preferable from the viewpoint of material availability and ease of synthesis.

$R^3$ and $R^4$ are each an alkyl group having 1 to 6 carbon atoms, preferably a hydrogen atom or a methyl group.

As the polymer chain P in General Formula III, the following ones are preferable.

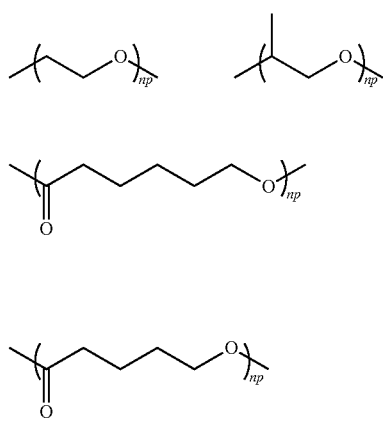

In the polymer chain P, np is preferably 3 to 300, more preferably 4 to 200, and still more preferably 5 to 100.

Specific examples of the polymer dispersant represented by General Formula III include the following ones.

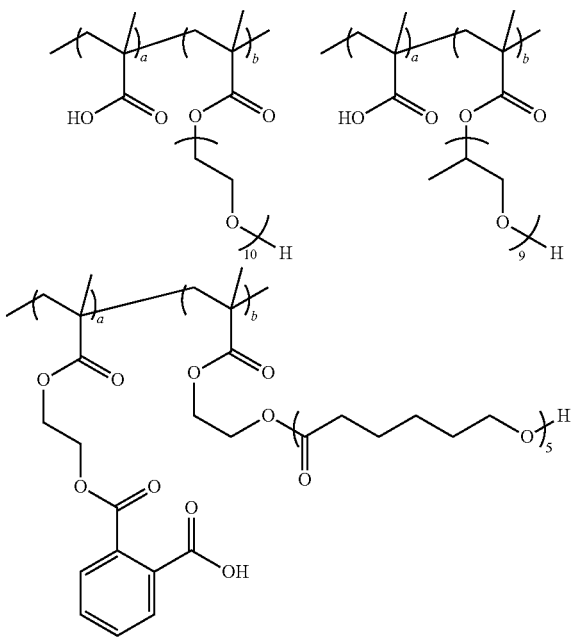

a:b in the polymer dispersant is preferably 1:9 to 7:3 and more preferably 2:8 to 5:5.

The molecular weight of the polymer dispersant is preferably 2,000 to 100,000, more preferably 3,000 to 50,000, and particularly preferably 5,000 to 30,000 in terms of weight-average molecular weight. In a case where the weight-average molecular weight is within this range, the quantum dots can be well dispersed in the acrylic monomer.

(Synthesis of Polymer Dispersant)

The ligands of General Formulae I and II can be synthesized by a known synthesis method. For example, in the method described in JP2007-277514A, the ligands can be synthesized by replacing the organic coloring agent moiety with a coordinating moiety.

The polymer dispersant of General Formula III can be synthesized by copolymerization of the corresponding monomer and polymer reaction to the precursor polymer. Examples of the monomer having a steric repulsive group in the side chain include commercially available products such as BLEMMER AE-400 (NOF Corporation) and BLEMMER AP-800 (NOF Corporation).

(Other Additives)

The coating liquid for forming a fluorescent region containing the phosphor 31 and the curable composition to be the binder 33 as described above may contain a viscosity adjuster, a silane coupling agent, a surfactant, an antioxidant, an oxygen getter, a polymerization inhibitor, scattering particles, a refractive index adjuster, and the like.

—Viscosity Adjuster—

The coating liquid for forming a fluorescent region may contain a viscosity adjuster, if necessary. Addition of a viscosity adjuster makes it possible to adjust to the desired viscosity. The viscosity adjuster is preferably a filler having a particle diameter of 5 nm to 300 nm. In addition, the viscosity adjuster may be a thixotropic agent. In the present invention and the present specification, the term "thixotropy" refers to a property of decreasing the viscosity with increasing shear rate in a liquid composition, and the term "thixotropic agent" refers to a material having a function of imparting thixotropy to a composition by incorporation thereof into a liquid composition. Specific examples of the thixotropic agent include fumed silica, alumina, silicon nitride, titanium dioxide, calcium carbonate, zinc oxide, talc, mica, feldspar, kaolinite (kaolin clay), pyrophyllite (pyrophyllite clay), sericite (silk mica), bentonite, smectite-vermiculites (montmorillonite, beidellite, nontronite, saponite, and the like), organic bentonite, and organic smectite.

—Surfactant—

The coating liquid for forming a fluorescent region may contain at least one surfactant containing fluorine atoms in an amount of 20% by mass or more.

—Antioxidant—

The coating liquid for forming a fluorescent region preferably contains a known antioxidant. The antioxidant is for suppressing color fading by heat or photo-irradiation, and for suppressing color fading by various oxidizing gases such as ozone, active oxygen $NO_x$, and $SO_x$ (X is an integer). Especially in the present invention, addition of the antioxidant brings about advantages that the cured film is prevented from being colored and the film thickness is prevented from being reduced through decomposition.

Further, two or more antioxidants may be used as the antioxidant.

The content of the antioxidant in the curable compound is preferably 0.2% by mass or more, more preferably 1% by mass or more, and still more preferably 2% by mass or more with respect to the total mass of the curable compound. On the other hand, the antioxidant may be altered due to the interaction with oxygen. The altered antioxidant may induce decomposition of each component in the coating liquid for forming a fluorescent region, resulting in lowering of adhesiveness, brittleness deterioration, and lowering of quantum dot luminous efficiency. From the viewpoint of preventing these deteriorations, the content of the antioxidant is preferably 20% by mass or less, more preferably 15% by mass or less, and still more preferably 10% by mass or less.

The antioxidant is preferably at least one of a radical inhibitor, a metal deactivator, a singlet oxygen scavenger, a superoxide scavenger, or a hydroxy radical scavenger. Examples of the antioxidant include a phenol-based antioxidant, a hindered amine-based antioxidant, a quinone-based antioxidant, a phosphorus-based antioxidant, and a thiol-based antioxidant.

Examples of the phenol-based antioxidant include 2,6-di-tert-butyl-p-cresol, 2,6-diphenyl-4-octadecyloxyphenol, distearyl (3,5-di-tert-butyl-4-hydroxybenzyl)phosphonate, 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[3-(3,5-di-tert-butyl-4-hydroxyphenyl)propionic acid methyl] methane ((ADEKASTAB AO-60, manufactured by ADEKA Corporation)), thiodiethylene glycol bis[(3,5-di-tert-butyl-4-hydroxyphenyl)propionate], 1,6-hexamethylene bis[(3,5-di-tert-butyl-4-hydroxyphenyl)propionate], bis [3,3-bis(4-hydroxy-3-tert-butylphenyl)butyl acid]glycol ester, bis[2-tert-butyl-4-methyl-6-(2-hydroxy-3-tert-butyl-5-methylbenzyl) phenyl]terephthalate, 1,3,5-tris[(3,5-di-tert-butyl-4- hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol bis[(3-tert-butyl-4-hydroxy-5-methylphenyl)propionate].

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphites of 2-ethyl-2-butylpropylene glycol and 2,4,6-tri-tert-butylphenol. The amount of these phosphorus-based antioxidants added is preferably 0.001 to 10 parts by mass and particularly preferably 0.05 to 5 parts by mass with respect to 100 parts by mass of the polyolefin-based resin.

Examples of the thiol-based antioxidant include dialkyl thiodipropionates such as dilauryl thiodipropionate, dimyristyl thiodipropionate, and distearyl thiodipropionate; and pentaerythritol tetra(3-alkyl mercaptopropionic acid) esters.

The hindered amine-based antioxidant is also referred to as a hindered amine lightstabilizer (HIALS), and has a structure in which all hydrogen atoms on carbons at 2- and 6-positions of piperidine are substituted with methyl groups, preferably a group represented by Formula 1. In Formula 1, X represents a hydrogen atom or an alkyl group. Among the groups represented by Formula 1, HALS having a 2,2,6,6-tetramethyl-4-piperidyl group in which X is a hydrogen atom, or a 1,2,2,6,6-pentamethyl-4-piperidyl group in which X is a methyl group is particularly preferably adopted. A number of HALS having a structure in which a group represented by Formula 1 is bonded to a —COO— group, that is, a group represented by Formula 2 are commercially available, but these can be preferably used.

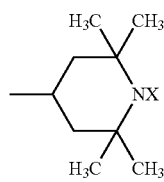

(Formula 1)

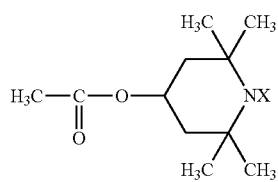

(Formula 2)

Specific examples of HALS that can be preferably used in the present invention include those represented by the following formulae. Here, the 2,2,6,6-tetramethyl-4-piperidyl group is represented by R and the 1,2,2,6,6-pentamethyl-4-piperidyl group is represented by R'.

ROC(=O)(CH$_2$)$_8$C(=O)OR, ROC(=O)C(CH$_3$)=CH$_2$, R'OC(=O)C(CH$_3$)=CH$_2$, CH$_2$(COOR)CH(COOR)CH(COOR)CH$_2$COOR, CH$_2$(COOR')CH(COOR')CH(COOR')CH$_2$COOR', a compound represented by Formula 3, and the like.

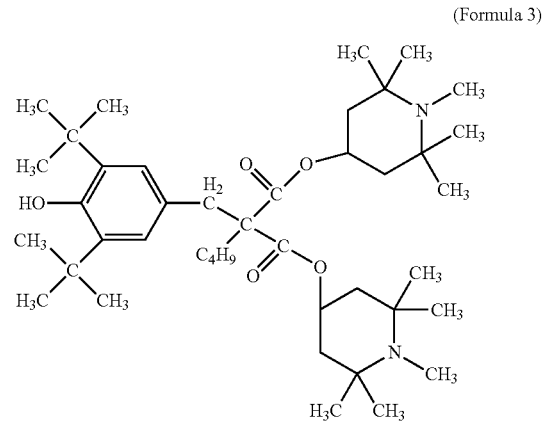

(Formula 3)

Specific examples of HALS include hindered amine compounds such as 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)-di(tridecyl)-1,2,3,4-butane tetracarboxylate, bis(1,2,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, and 1,6,11-tris[2,4-bis(N-butyl-N-(1,2,2,6,6-pentamethyl-4-piperidyl)amino)-s-triazin-6-yl]aminoundecane.

Specific products of HALS include, but are not limited to, TINUVIN 123, TINUVIN 144, TINUVIN 765, TINUVIN 770, TINUVIN 622, CHIMASSORB 944, and CHIMASSORB 119 (all of which are trade names of Ciba Specialty Chemicals Inc.), ADEKASTAB LA52, ADEKASTAB LA57, ADEKASTAB LA62, ADEKASTAB LA67, ADEKASTAB LA82, ADEKASTAB LA87, and ADEKASTAB LX335 (all of which are trade names of Asahi Denka Kogyo KK).

Among the HALS, those having a relatively small molecular weight are preferable because of easy diffusion from the resin layer to the fluorescent region. Preferred HALS in this viewpoint are compounds represented by ROC(=O)(CH$_2$)$_8$C(=O)OR, R'OC(=O)C(CH$_3$)=CH$_2$, and the like.

Among the above-mentioned antioxidants, at least one of a hindered phenol compound, a hindered amine compound, a quinone compound, a hydroquinone compound, a tocopherol compound, an aspartic acid compound, or a thiol compound is more preferable, and at least one of a citric acid compound, an ascorbic acid compound, or a tocopherol compound is still more preferable. Although these compounds are not particularly limited, preferred examples thereof include hindered phenol, hindered amine, quinone, hydroquinone, tocopherol, aspartic acid, thiol, citric acid, tocopheryl acetate, and tocopheryl phosphate per se, and salts or ester compounds thereof.

An example of the antioxidant is shown below.

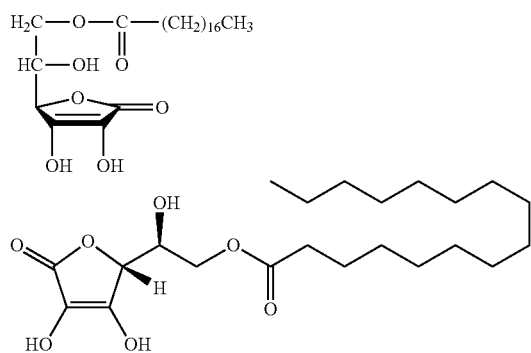

Ascorbic acid palmitic acid ester (ascorbyl palmitate)

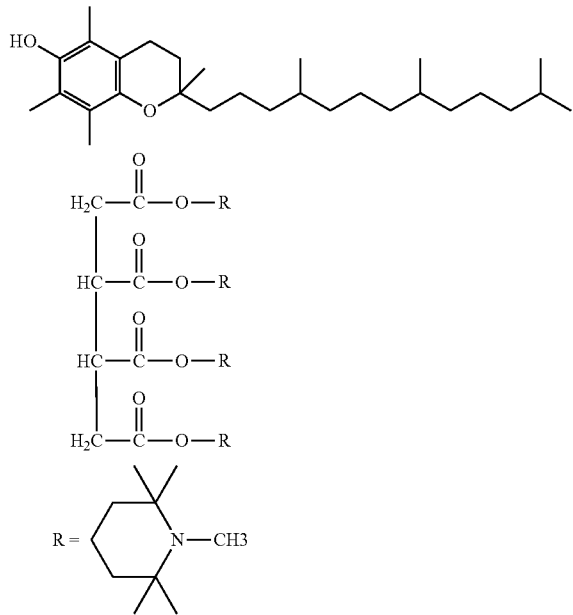

Tetrakis(1,2,2,6,6-pentamethyl-4-piperidyl)butane-1,2,3,4-tetracarboxylate (trade name: ADEKASTAB LA-52, manufactured by ADEKA Corporation)

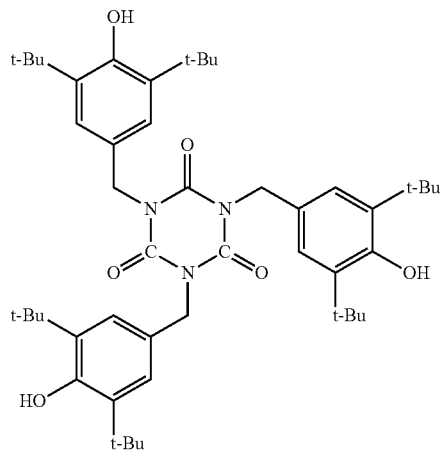 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

1,3,5-tris(3,5-di-tert-butyl-4-hydroxybenzyl)-1,3,5-triazine-2,4,6(1H, 3H, 5H)-trione (trade name: ADEKASTAB AO-20, manufactured by ADEKA Corporation)

B-3

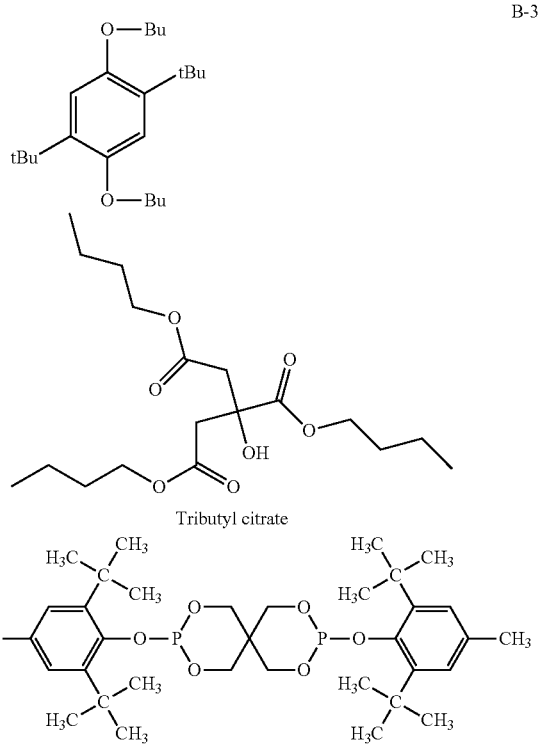

Tributyl citrate 3,9-bis(2,6-di-tert-butyl-4-methylphenoxy)-2,4,8,10-tetraoxa-3,9-diphosphaspiro[5,5]undecane (trade name: ADEKASTAB PEP-36, manufactured by ADEKA Corporation)

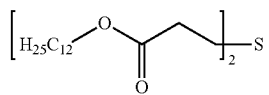

Dilauryl thiodipropionate (IRGANOX PS 800, 800FD, manufactured by BASF Corporation)

—Oxygen Getter—

A known substance used as a getter of an organic EL device or the like can be used as the oxygen getter. The oxygen getter may be either an inorganic getter or an organic getter, and is preferable to include at least one compound selected from a metal oxide, a metal halide, a metal sulfate, a metal perchlorate, a metal carbonate, a metal alkoxide, a metal carboxylate, a metal chelate, or a zeolite (aluminosilicate).

Examples of such an oxygen getter include calcium oxide (CaO), barium oxide (BaO), magnesium oxide (MgO), strontium oxide (SrO), lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$), and nickel sulfate ($NiSO_4$).

The organic getter is not particularly limited as long as it is a material that takes in water by a chemical reaction and does not become opaque before and after the reaction. Here, the organometallic compound means a compound having a metal-carbon bond, a metal-oxygen bond, a metal-nitrogen bond or the like. In a case where water reacts with the organometallic compound, the above-mentioned bond of the compound breaks due to a hydrolysis reaction to result in a metal hydroxide. Depending on the metal, hydrolytic polycondensation may be carried out to increase the molecular weight after the reaction into the metal hydroxide.

As the metal of the metal alkoxide, the metal carboxylate, and the metal chelate, it is preferable to use a metal having good reactivity with water as the organometallic compound, that is, a metal atom which is easily breakable from a variety of bonds by the action of water. Specific examples thereof include aluminum, silicon, titanium, zirconium, bismuth, strontium, calcium, copper, sodium, and lithium. In addition, cesium, magnesium, barium, vanadium, niobium, chromium, tantalum, tungsten, chromium, indium, iron, and the like can be mentioned. In particular, a desiccating agent of an organometallic compound having aluminum as a central metal is preferable in terms of dispersibility in a resin and reactivity with water. Examples of the organic group include an unsaturated hydrocarbon such as a methoxy group, an ethoxy group, a propoxy group, a butoxy group, a 2-ethylhexyl group, an octyl group, a decyl group, a hexyl group, an octadecyl group, a stearyl group, a saturated hydrocarbon, a branched unsaturated hydrocarbon, a branched saturated hydrocarbon, an alkoxy group or carboxyl group containing a cyclic hydrocarbon, and a β-diketonato group such as an acetylacetonato group or a dipivaloylmethanato group.

Among them, aluminum ethyl acetoacetates having 1 to 8 carbon atoms shown in the following chemical formulae are suitably used from the viewpoint that a sealing composition having excellent transparency can be formed.

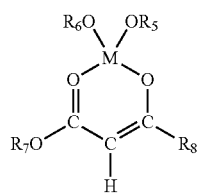

(In the formula, $R_5$ to $R_8$ each represent an organic group including an alkyl group, an aryl group, an alkoxy group, a cycloalkyl group or an acyl group, each of which has 1 to 8 carbon atoms, and M represents a trivalent metal atom. In addition, $R_5$ to $R_8$ may be the same organic group or different organic groups.)

The above-mentioned aluminum ethyl acetoacetates having 1 to 8 carbon atoms are commercially available, for example, from Kawaken Fine Chemical Co., Ltd. or Hope Pharmaceutical Co., Ltd.

The oxygen getter is in particulate or powder form. The average particle diameter of the oxygen getter may be usually in the range of less than 20 μm, preferably 10 μm or less, more preferably 2 μm or less, and still more preferably 1 μm or less. From the viewpoint of scattering property, the average particle diameter of the oxygen getter is preferably 0.3 to 2 μm and more preferably 0.5 to 1.0 μm. The term "average particle diameter" as used herein refers to an average value of particle diameters calculated from a particle size distribution measured by a dynamic light scattering method.

—Polymerization Inhibitor—

The coating liquid for forming a fluorescent region may contain a polymerization inhibitor. The content of the polymerization inhibitor is 0.001% to 1% by mass, more preferably 0.005% to 0.5% by mass, and still more preferably 0.008% to 0.05% by mass, with respect to all the polymerizable monomers. Changes in viscosity over time can be suppressed while maintaining a high curing sensitivity by blending the polymerization inhibitor in an appropriate amount. On the other hand, in a case where the amount of the polymerization inhibitor to be added is excessive, curing failure or coloration of the cured product due to inhibition of polymerization occurs, so an appropriate amount of the polymerization inhibitor is present. The polymerization inhibitor may be added at the time of production of the polymerizable monomer or may be added later to the curable composition. Preferred examples of the polymerization inhibitor include hydroquinone, p-methoxyphenol, di-tert-butyl-p-cresol, pyrrogallol, tert-butylcatechol, benzoquinone, 4,4'-thiobis(3-methyl-6-tert-butylphenol), 2,2'-methylenebis(4-methyl-6-tert-butylphenol), cerous N-nitrosophenylhydroxyamine, phenothiazine, phenoxazine, 4-methoxynaphthol, 2,2,6,6-tetramethylpiperidine-1-oxyl free radical, 2,2,6,6-tetramethylpiperidine, 4-hydroxy-2,2,6,6-tetramethylpiperidine-1-oxyl free radical, nitrobenzene, and dimethylaniline, among which preferred is p-benzoquinone, 2,2,6,6-tetramethylpiperidine-1-oxyl free radical, 4-hydroxy-2,2,6,6-tetramethylpiperidine-1-oxyl free radical, or phenothiazine. These polymerization inhibitors suppress generation of polymer impurities not only during the production of the polymerizable monomers but also during storage of the curable composition and suppress degradation of pattern formability during imprinting.

—Light Scattering Particles—

The fluorescent region may contain light scattering particles. Therefore, light scattering particles may be added to the coating liquid for forming a fluorescent region.

The particle size of the light scattering particles is preferably 0.10 μm or more. Incorporation of the light scattering particles in the wavelength conversion layer is preferable from the viewpoint of further improving the luminance. From the viewpoint of the light scattering effect, the particle size of the light scattering particles is preferably in the range of 0.10 to 15.0 μm, more preferably in the range of 0.10 to 10.0 μm, and still more preferably in the range of 0.20 to 4.0 μm. Two or more types of light scattering particles having different particle sizes may be mixed and used in order to further improve the luminance and adjust the distribution of the luminance with respect to the viewing angle.

The light scattering particles may be organic particles, inorganic particles, or organic-inorganic composite particles. For example, synthetic resin particles can be mentioned as organic particles. Specific examples of synthetic resin particles include silicone resin particles, acrylic resin particles (polymethyl methacrylate (PMMA)), nylon resin particles, styrene resin particles, polyethylene particles, urethane resin particles, and benzoguanamine particles. From the viewpoint of the light scattering effects, it is preferred that the refractive indices of the light scattering particles and the other portion are different in the wavelength conversion layer, and from this point of view, the silicone resin particles and acrylic resin particles are preferable from the viewpoint of easy availability of particles having a suitable refractive index. Particles having a hollow structure can also be used. As the inorganic particles, particles of diamond, titanium oxide, zirconium oxide, lead oxide, lead carbonate, zinc oxide, zinc sulfide, antimony oxide, silicon oxide, aluminum oxide or the like can be used. Titanium oxide and aluminum oxide are preferable from the viewpoint of easy availability of particles having a suitable refractive index.

In order to adjust the refractive index of the fluorescent region, particles having a smaller particle size than the light scattering particles can be used as the refractive index adjuster. The particle size of the refractive index adjuster is less than 0.1 μm and preferably in the range of 0.01 μm to 0.1 μm.

Examples of refractive index adjusting particles include particles of diamond, titanium oxide, zirconium oxide, lead oxide, lead carbonate, zinc oxide, zinc sulfide, antimony oxide, silicon oxide, aluminum oxide, and the like. Among them, particles of zirconium oxide or silicon oxide are preferable in terms of less absorption of blue light and ultraviolet light, and particles of zirconium oxide are preferable because the refractive index can be adjusted with a small amount. Titanium oxide is also preferred in terms of dispersibility. The refractive index adjusting particles may be used in an amount that allows adjustment of the refractive index, and the content in the light scattering layer is not particularly limited.

In addition to the above-mentioned components, a releasing agent, an ultraviolet absorber, a light stabilizer, an anti-aging agent, a plasticizer, an adhesion promoter, a thermal polymerization initiator, a colorant, elastomer particles, a photoacid proliferating agent, a photobase generator, a basic compound, a flow adjusting agent, an antifoaming agent, a dispersant, or the like may be optionally added to the coating liquid for forming a fluorescent region.

The method for preparing the coating liquid for forming a fluorescent region is not particularly limited, and it may be carried out by a procedure for preparing a common curable composition.

«Resin Layer»

The resin layer 38 is formed by applying and curing a coating liquid for forming a resin layer containing the same curable composition as the above-mentioned curable composition forming a binder.

The curable composition for forming a resin layer and the curable composition for forming a binder may be the same as or different from each other. Further, the curable composition forming a resin layer may not contain a polymer dispersant.

The resin layer 38 has a modulus of elasticity of preferably 0.5 GPa or more and 10 GPa or less, more preferably 1 GPa or more and 7 GPa or less, and particularly preferably 3 GPa or more and 6 GPa or less. In a case where the modulus of elasticity of the resin layer is set to fall within this range, it is possible to prevent defects during the formation of the resin layer, which is thus preferable.

The modulus of elasticity of the resin layer is measured by a method exemplified in JIS K7161 or the like.

The material for forming the resin layer 38 is preferably a compound having a di- or higher functional photopolymerizable crosslinking group, and examples thereof include alicyclic (meth)acrylate such as urethane (meth)acrylate or tricyclodecanedimethanol di(meth)acrylate; (meth)acrylate having a hydroxyl group such as pentaerythritol triacrylate; aromatic (meth)acrylate such as modified bisphenol A di(meth)acrylate; dipentaerythritol di(meth)acrylate, 3,4-epoxycyclohexylmethyl (meth)acrylate, 3',4'-epoxycyclohexylmethyl 3,4-epoxycyclohexane carboxylate, and a bisphenol A type epoxy compound. Above all, it is preferable to include at least urethane (meth)acrylate and an epoxy compound. By using a compound having a urethane bond or a polar functional group such as a hydroxyl group or a carboxyl group, the intermolecular interaction can be enhanced. It is preferable to include a compound having the same polymerizable crosslinking group as that of the fluorescent region from the viewpoint of excellent intimate attachment between the resin layer and the fluorescent region. For example, in a case where dicyclopentanyl (meth)acrylate or the like is contained in the material of the fluorescent region, the resin layer suitably contains at least a (meth)acrylate compound.

(Additives)

The coating liquid for forming a resin layer may optionally contain a photopolymerization initiator, an inorganic layered compound, scattering particles, an antioxidant, a release promoter, a solvent, and the like.

(Photopolymerization Initiator)

The curable compound forming the resin layer 38 preferably contains a photopolymerization initiator. Any photopolymerization initiator may be used as long as it is a compound capable of generating an active species that polymerizes the polymerizable compound upon photo-irradiation. Examples of the photopolymerization initiator include a cationic polymerization initiator and a radical polymerization initiator, which are appropriately selected according to the resin layer forming material.

(Scattering Particles)

The coating liquid for forming a resin layer may contain scattering particles. The scattering particles may be, for example, scattering particles similar to the scattering particles that can be contained in the coating liquid for forming a fluorescent region described above.

A certain ratio can be taken for the ratio of the volume Vp of the fluorescent region to the volume Vb of the resin layer, but the ratio of the volume Vp of the fluorescent region to the volume (Vp+Vb) of the entire wavelength conversion layer is preferably $0.1 \leq Vp/(Vp+Vb) < 0.9$, more preferably $0.2 \leq Vp/(Vp+Vb) < 0.85$, and particularly preferably $0.3 \leq Vp/(Vp+Vb) < 0.8$. In a case where the volume ratio of the fluorescent region is too small, the initial luminance at a certain thickness tends to decrease, and in a case where the volume ratio of the fluorescent region is too large, the width of the resin layer becomes short and therefore the strength of the resin layer may decrease. Note that the region Vp containing phosphors and the region Vb of the resin layer are defined as being multiplied by each area and thickness in a case of being observed from the main surface of the wavelength conversion member.

—Substrate Film—

The first substrate film 10 and the second substrate film 20 are for supporting the wavelength conversion layer, and a substrate film used as a support in a variety of laminated films can be used.

It is preferable that the substrate films 10 and 20 have gas barrier properties. The substrate films 10 and 20 may be constituted by only a support having sufficient barrier properties or may have a configuration which comprises a barrier layer on one surface of the support film.

The first substrate film 10 and the second substrate film 20 have a total light transmittance in the visible light region of preferably 80% or more and more preferably 85% or more. The visible light region refers to a wavelength range of 380 to 780 nm, and the total light transmittance refers to an average value of light transmittances over the visible light region.

The substrate films 10 and 20 are preferably a flexible belt-like support which is transparent to visible light. The phrase "transparent to visible light" as used herein means that the light transmittance in the visible light region is 80% or more and preferably 85% or more. The light transmittance for use as a measure of transparency can be calculated by the method described in JIS-K7105, namely, by measuring a total light transmittance and an amount of scattered light using an integrating sphere type light transmittance measuring apparatus, and subtracting the diffuse transmittance from the total light transmittance. With respect to the flexible support, reference can be made to paragraphs [0046] to [0052] of JP2007-290369A and paragraphs [0040] to [0055] of JP2005-096108A.

The oxygen permeability of the first substrate film 10 and the second substrate film 20 is preferably 1.00 cc/($m^2$·day·atm) or less. The oxygen permeability is more preferably 0.1 cc/($m^2$·day·atm) or less, still more preferably 0.01 cc/($m^2$·day·atm) or less, and particularly preferably 0.001 cc/($m^2$·day·atm) or less. The oxygen permeability here is a value measured using an oxygen gas permeability measuring apparatus (OX-TRAN 2/20, trade name, manufactured by MOCON Inc.) under conditions of a measurement temperature of 23° C. and a relative humidity of 90%.

In addition to having a gas barrier function of blocking oxygen, the first substrate film 10 and the second substrate film 20 preferably have a function of blocking moisture (water vapor). The moisture permeability (water vapor permeability) of the first substrate film 10 and the second substrate film 20 is preferably 0.10 g/($m^2$·day·atm) or less and more preferably 0.01 g/($m^2$·day·atm) or less.

(Support Film)

The support film is preferably a flexible belt-like support which is transparent to visible light. The phrase "transparent to visible light" as used herein means that the light transmittance in the visible light region is 80% or more and preferably 85% or more. The light transmittance for use as a measure of transparency can be calculated by the method described in JIS-K7105, namely, by measuring a total light transmittance and an amount of scattered light using an integrating sphere type light transmittance measuring apparatus, and subtracting the diffuse transmittance from the total light transmittance. With respect to the flexible support, reference can be made to paragraphs [0046] to [0052] of JP2007-290369A and paragraphs [0040] to [0055] of JP2005-096108A.

The support film preferably has barrier properties against oxygen and moisture. Preferred examples of such a support film include a polyethylene terephthalate film, a film made of a polymer having a cyclic olefin structure, and a polystyrene film.

The average film thickness of the support film is preferably 10 µm or more and 500 µm or less, more preferably 20 µm or more and 400 µm or less, and still more preferably 30 µm or more and 300 µm or less from the viewpoint of impact resistance or the like of the wavelength conversion member. Since it is preferred that the absorbance of light having a wavelength of 450 nm is lower in an aspect of increasing the retroreflection of light as in a case where the concentration of the quantum dots contained in the wavelength conversion layer 30 is reduced or in a case where the thickness of the wavelength conversion layer 30 is reduced, the average film thickness of the support film is preferably 40 µm or less and more preferably 25 µm or less from the viewpoint of suppressing reduction in luminance.

Further, in the support film, the in-plane retardation Re (589) at a wavelength of 589 nm is preferably 1000 nm or less, more preferably 500 nm or less, and still more preferably 200 nm or less.

In a case of inspecting the presence or absence of foreign matters and defects after preparing the wavelength conversion member, arranging two polarizing plates at the extinction position, inserting the wavelength conversion member therebetween and observing it makes it easy to find foreign matters and defects. In a case where the Re (589) of the support is within the above range, foreign matters and defects are more easily found at the time of inspection using a polarizing plate, which is thus preferable.

Here, the Re (589) can be measured by making light having an input wavelength of 589 nm incident in the normal direction of the film using an AxoScan OPMF-1 (manufactured by Opto Science, Inc.).

(Barrier Layer)

The first substrate film 10 and the second substrate film 20 preferably comprise a barrier layer containing at least one inorganic layer formed in contact with the surface of the support film on the wavelength conversion layer 30 side. The barrier layer may include at least one inorganic layer and at least one organic layer. Lamination of a plurality of layers in this way is preferable from the viewpoint of improving the light resistance due to being capable of further more enhancing barrier properties. On the other hand, the light transmittance of the substrate film tends to decrease as the number of layers to be laminated is increased, and therefore it is desirable to increase the number of laminated layers as long as a satisfactory light transmittance can be maintained.

The barrier layer preferably has a total light transmittance in the visible light region of preferably 80% or more and an oxygen permeability of 1.00 cc/($m^2$·day·atm) or less.

The oxygen permeability of the barrier layer is more preferably 0.1 cc/($m^2$·day·atm) or less, particularly preferably 0.01 cc/($m^2$ day·atm) or less, and more particularly preferably 0.001 cc/($m^2$·day·atm) or less.

A lower oxygen permeability is more preferable, and a higher total light transmittance in the visible light region is more preferable.

—Inorganic Layer—

The inorganic layer is a layer containing an inorganic material as a main component, is preferably a layer in which the inorganic material occupies 50% by mass or more, further 80% by mass or more, particularly 90% by mass or more, and is preferably a layer formed from only an inorganic material.

The inorganic layer is preferably a layer having a gas barrier function of blocking oxygen. Specifically, the oxygen permeability of the inorganic layer is preferably 1.00 cc/(m$^2$·day·atm) or less. The oxygen permeability of the inorganic layer can be determined by attaching a wavelength conversion layer to a detector of an oxygen concentration meter manufactured by Orbisphere Laboratories, through silicone grease, and then converting the oxygen permeability from the equilibrium oxygen concentration value. It is also preferred that the inorganic layer has a function of blocking water vapor.

Two or three or more inorganic layers may also be included in the barrier layer.

The thickness of the inorganic layer may be 1 to 500 nm, and is preferably 5 to 300 nm and particularly preferably 10 to 150 nm. This is because the film thickness of the inorganic layer in the above range is capable of suppressing reflection on the inorganic layer while achieving satisfactory barrier properties, whereby a laminated film with higher light transmittance can be provided.

The inorganic material constituting the inorganic layer is not particularly limited, and for example, a metal, or various inorganic compounds such as inorganic oxides, nitrides or oxynitrides can be used therefor. For elements constituting the inorganic material, silicon, aluminum, magnesium, titanium, tin, indium, and cerium are preferable, and these elements may be included singly or two or more thereof may be included. Specific examples of the inorganic compound include silicon oxide, silicon oxynitride, aluminum oxide, magnesium oxide, titanium oxide, tin oxide, an indium oxide alloy, silicon nitride, aluminum nitride, and titanium nitride. As the inorganic layer, a metal film, for example, an aluminum film, a silver film, a tin film, a chromium film, a nickel film, or a titanium film may also be provided.

It is particularly preferred that the inorganic layer having barrier properties is an inorganic layer containing at least one compound selected from silicon nitride, silicon oxynitride, silicon oxide, or aluminum oxide, among the above-mentioned materials. This is because the inorganic layer formed of such a material is satisfactory in adhesiveness to the organic layer, and therefore, not only, even in a case where the inorganic layer has a pinhole, the organic layer can effectively fill in the pinhole to suppress fracture, but also, even in a case where the inorganic layer is laminated, an extremely satisfactory inorganic layer film can be formed to result in a further enhancement in barrier properties. From the viewpoint of suppressing absorption of light in the barrier layer, silicon nitride is most preferable.

The method of forming an inorganic layer is not particularly limited, and for example, a variety of film forming methods capable of evaporating or scattering a film forming material and depositing it on the deposition target surface can be used.

Examples of the method of forming an inorganic layer include a physical vapor deposition method (PVD method) such as a vacuum vapor deposition method of beating an inorganic material such as an inorganic oxide, an inorganic nitride, an inorganic oxynitride, or a metal to cause vapor deposition thereof; an oxidation reaction vapor deposition method of using an inorganic material as a starting material and introducing oxygen gas for oxidation to cause vapor deposition thereof; a sputtering method of using an inorganic material as a target starting material and introducing argon gas or oxygen gas for sputtering to cause vapor deposition; or an ion plating method of causing heating of an inorganic material by a plasma beam generated by a plasma gun to cause vapor deposition; and a plasma chemical vapor deposition method (CVD method) of using an organosilicon compound as a starting material in a case of forming a vapor deposited film of silicon oxide.

—Organic Layer—

The organic layer refers to a layer containing an organic material as a main component, in which the organic material preferably occupies 50% by mass or more, more preferably 80% by mass or more, and particularly preferably 90% by mass or more.

With respect to the organic layer, reference can be made to paragraphs [0020] to [0042] of JP2007-290369A and paragraphs [0074] to [0105] of JP2005-096108A. It is preferred that the organic layer contains a cardo polymer within a range satisfying the above-mentioned adhesion force conditions. This is because adhesiveness to the layer adjacent to the organic layer, in particular, also adhesiveness to the inorganic layer can be thus improved to achieve excellent gas barrier properties. With respect to details of the cardo polymer, reference can be made to paragraphs [0085] to [0095] of JP2005-096108A described above.

The film thickness of the organic layer is preferably in the range of 0.05 to 10 μm, inter alia, preferably in the range of 0.5 to 10 μm. In a case where the organic layer is formed by a wet coating method, the film thickness of the organic layer is in the range of 0.5 to 10 μm, inter alia, preferably in the range of 1 to 5 μm. In a case where the organic layer is formed by a dry coating method, the film thickness of the organic layer is in the range of 0.05 to 5 μm, inter alia, preferably in the range of 0.05 to 1 μm. This is because the film thickness of the organic layer formed by a wet coating method or a dry coating method in the above-specified range is capable of further improving adhesiveness to the inorganic layer.

With respect to other details of the inorganic layer and the organic layer, reference can be made to the descriptions of JP2007-290369A and JP2005-096108A described above and US2012/0113672A1.

In the wavelength conversion member, the organic layer may be laminated as the underlayer of the inorganic layer between the support film and the inorganic layer, and may be laminated as the protective layer of the inorganic layer between the inorganic layer and the wavelength conversion layer. Further, in a case of having two or more inorganic layers, the organic layer may be laminated between the inorganic layers.

(Concavity-Convexity Imparting Layer)

The substrate films 10 and 20 may comprise a concavity-convexity imparting layer for imparting a concavo-convex structure on the surface opposite to the surface on the wavelength conversion layer 30 side. In a case where the substrate films 10 and 20 have a concavity-convexity imparting layer, the blocking property and sliding property of the substrate film can be improved, which is thus preferable. The concavity-convexity imparting layer is preferably a layer containing particles. Examples of the particles include inorganic particles such as silica, alumina, or metal oxide, and organic particles such as crosslinked polymer particles. The concavity-convexity imparting layer is preferably provided on the surface of the substrate film opposite to the wavelength conversion layer, but it may be provided on both surfaces of the substrate film.

<Method of Producing Wavelength Conversion Member>

Next, an example of the production step of the wavelength conversion member according to the embodiment of the present invention configured as described above will be described with reference to FIGS. 8 and 9.

(Coating Liquid Preparation Step)

In the first coating liquid preparation step, a coating liquid for forming a fluorescent region containing quantum dots (or quantum rods) as phosphors is prepared. Specifically, individual components such as quantum dots dispersed in an organic solvent, a curable compound, a polymer dispersant, a polymerization initiator, and a silane coupling agent are mixed in a tank or the like to prepare a coating liquid for forming a fluorescent region. Note that the coating liquid for forming a fluorescent region may not contain an organic solvent.

In the second coating liquid preparation step, a coating liquid for forming a resin layer to be filled between the fluorescent regions is prepared.

(Resin Layer Forming Step)

Figure 8:
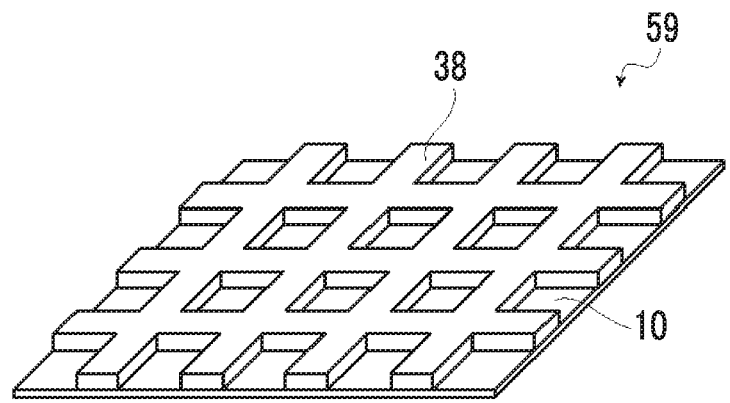
FIG. 8 is a schematic view for explaining a method of preparing a wavelength conversion member of the present invention.
Figure 9:
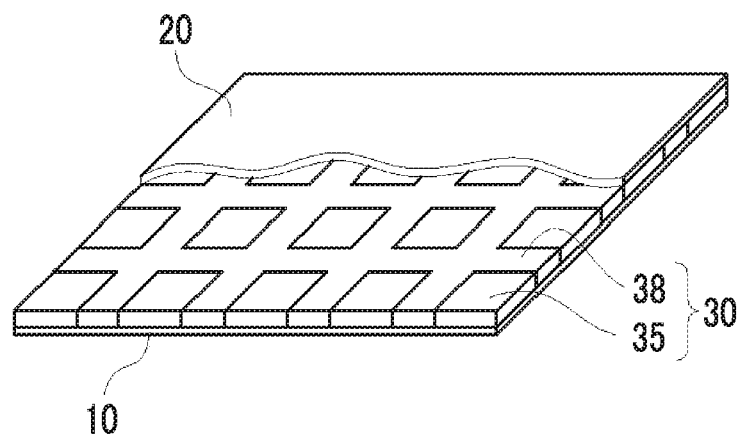
FIG. 9 is a schematic view for explaining the method of preparing a wavelength conversion member of the present invention.

Next, a coating liquid for forming a resin layer is applied onto the first substrate film 10, and a mold having a concavo-convex pattern is pressed against the applied coating liquid for forming a resin layer to form a predetermined pattern having a concave portion, and the coating liquid for forming a resin layer is cured to form a laminated film 59 in which the resin layer 38 having a plurality of concave portions is laminated on the first substrate film 10, as shown in FIG. 8.

At this time, by giving fine concavo-convex shape to the surface of a mold having a concavo-convex pattern, it is possible to set the surface roughness Ra of the resin layer after forming the concave portion to a predetermined range.

(Fluorescent Region Forming Step and Second Substrate Film Adhesion Step)

Next, the coating liquid for forming a fluorescent region is applied into the concave portion of the resin layer 38 of the laminated film 59, the second substrate film 20 is bonded before curing the coating liquid for forming a fluorescent region, and then the coating liquid for forming a fluorescent region is cured to form a fluorescent region 35 to prepare a wavelength conversion member in which the first substrate film 10, the wavelength conversion layer 30, and the second substrate film 20 are laminated.

With respect to the curing treatment in the fluorescent region forming step and the resin layer forming step, thermal curing, photocuring with ultraviolet light, or the like may be appropriately selected depending on the coating liquid.

In a case where the resin layer 38 is cured by photocuring with ultraviolet light, the irradiation dose of ultraviolet light is preferably 100 to 10000 mJ/cm$^2$.

In a case where the resin layer 38 is cured by thermal curing, it is preferable to heat the resin layer 38 to 20° C. to 100° C.

(Cutting Process)

The obtained wavelength conversion member is cut by a cutting machine as necessary.

Incidentally, as for the method for preparing a wavelength conversion member, each of the above-described steps may be carried out continuously by a so-called roll-to-roll (RtoR), or alternatively, the treatment of each step may be carried out in a so-called single wafer type using the substrate film in the form of a cut sheet.

Here, a method of forming a plurality of concave portions (concavo-convex pattern) in the coating liquid for a resin layer applied to the first substrate film 10 will be specifically described.

As the formation of the pattern, as described above, it is possible to use a method of forming a fine concavo-convex pattern by pressing a mold having a concavo-convex pattern against a coating liquid for a resin layer applied onto a substrate film.

Pattern formation can also be carried out by an ink jet method or a dispenser method.

The mold usable herein is a mold having a pattern to be transferred. The pattern on the mold may be formed according to desired processing accuracy, for example, by photolithography, electron beam lithography, or the like, but the method of forming a mold pattern is not particularly limited.

The light-transmissive mold material is not particularly limited, but any material having predetermined strength and durability may be used. Specific examples thereof include glass, quartz, a light-transparent resin such as PMMA or polycarbonate resin, a transparent metal vapor-deposited film, a flexible film made of polydimethylsiloxane or the like, a photocured film, and a metal film such as SUS.

On the other hand, the non-light-transmissive mold material is not particularly limited, but any material having a predetermined strength may be used. Specific examples of the mold material include a ceramic material, a vapor deposited film, a magnetic film, a reflective film, a metal substrate such as Ni, Cu, Cr, Fe or the like, and a substrate of SiC, silicon, silicon nitride, polysilicon, silicon oxide, amorphous silicon or the like. Further, the shape of the mold is not particularly limited, either a plate-like mold or a roll-like mold may be used. The roll-like mold is applied particularly in a case where continuous productivity of transfer is required.

A mold may be used which has been subjected to a surface release treatment in order to improve releasability between the curable composition and the mold surface. Such a mold may be, for example, a mold coated with a material having excellent water and oil repellency. Specifically, those in which polytetrafluoroethylene (PTFE) or diamond-like carbon (DLC) is vapor-deposited by physical vapor deposition (PVD) or chemical vapor deposition (CVD), and those treated with a silane coupling agent such as a silicon-based silane coupling agent or a fluorine-based silane coupling agent are exemplified, and in surface release treatment, for example, commercially available releasing agents such as OPTOOL DSX (manufactured by Daikin Industries, Ltd.) and Novec EGC-1720 (manufactured by Sumitomo 3M Ltd.) can also be suitably used.

Specific examples of a method for forming the concavo-convex pattern using the mold include a thermal imprinting method in which a mold is pressed against a resin layer applied and cured on a substrate film in a state where the resin layer or the mold is heated to form a concavo-convex pattern; a photoimprinting method in which a mold having a concavo-convex pattern is pressed against a coating liquid for a resin layer applied on a substrate film, and then the resin layer is cured with light to form a concavo-convex pattern; and a melt molding method for forming a concavo-convex pattern. Among them, a photoimprinting method is preferable from the viewpoint of excellent production rate and low capital investment.

In a case where photoimprint lithography is carried out, it is usually preferable to carry out the lithography at a mold pressure of 10 atm or less. In a case where the mold pressure is set to 10 atm or less, the mold and the substrate are hardly deformed and the pattern accuracy tends to improve. In addition, it is preferable from the viewpoint that the apparatus may be small-sized since the pressure to be given to the mold may be low. Regarding the mold pressure, it is preferable to select a region where uniformity of mold transfer can be secured within the range where the residual film of the curable composition in the area of mold projections is reduced.

The irradiation dose of photo-irradiation in the curing portion may be sufficiently larger than the irradiation dose necessary for curing. The irradiation dose necessary for curing is appropriately determined by examining the consumption amount of unsaturated bonds of the curable composition and the tackiness of the cured film.

In the photoimprint lithography, photo-irradiation is carried out while keeping the substrate temperature generally at room temperature, in which the photo-irradiation may alternatively be conducted under heating for the purpose of enhancing the reactivity. The photo-irradiation may be carried out in vacuo, since a vacuum conditioning prior to the photo-irradiation is effective for preventing entrainment of bubbles, suppressing the reactivity from being reduced due to incorporation of oxygen, and for improving the adhesiveness between the mold and the curable composition. In the pattern forming method, the degree of vacuum at the time of photo-irradiation is preferably in the range of $10^{-1}$ Pa to 1 atm.

The light used for curing the curable composition is not particularly limited, and examples thereof include light and radiation having a wavelength falling within a range of high-energy ionizing radiation, near ultraviolet light, far ultraviolet light, visible light, infrared light, and the like. The high-energy ionizing radiation source includes, for example, accelerators such as a Cockcroft accelerator, a Van de Graaff accelerator, a linear accelerator, a betatron, and a cyclotron. The electron beams accelerated by such an accelerator are used industrially most conveniently and economically; but any other radioisotopes and other radiations from nuclear reactors, such as γ-rays, X-rays, α-rays, neutron beams, and proton beams may also be used. Examples of the ultraviolet light source include an ultraviolet fluorescent lamp, a low-pressure mercury lamp, a high-pressure mercury lamp, an ultra-high-pressure mercury lamp, a xenon lamp, a carbon arc lamp, a solar lamp, and a light emitting diode (LED). Examples of the radiation include microwaves and extreme ultraviolet (EUV). In addition, laser light used in microfabrication of semiconductors, such as LED, semiconductor laser light, 248 nm KrF excimer laser light, and 193 nm ArF excimer laser, can also be suitably used in the present invention. The light may be monochromatic light or may also be a plurality of light of different wavelengths (mixed light).

Upon exposure, the exposure illuminance is preferably within a range of 1 mW/cm$^2$ to 1000 mW/cm$^2$. In a case where the exposure illuminance is set to 1 mW/cm$^2$ or more, then the productivity may increase since the exposure time may be reduced; and in a case where the exposure illuminance is set to 1,000 mW/cm$^2$ or less, then it is preferable since the properties of a permanent film may be prevented from being degraded owing to side reactions. The exposure dose is preferably in the range of 5 mJ/cm$^2$ to 10,000 mJ/cm$^2$. In a case where the exposure dose is less than 5 mJ/cm$^2$, the exposure margin becomes narrow and the photocuring becomes insufficient so that problems such as adhesion of unreacted materials to the mold are liable to occur. On the other hand, in a case where the exposure dose is more than 10,000 mJ/cm$^2$, there is a risk of deterioration of the permanent film due to decomposition of the composition. Further, at the time of exposure, in order to prevent inhibition of radical polymerization by oxygen, an inert gas such as nitrogen or argon may be flowed to control the oxygen concentration to be less than 100 mg/L.

In the curing portion, after the curable composition is cured through photo-irradiation, a step of further curing the curable composition by applying heat thereto may be included as necessary. The temperature of heat for curing with heating after photo-irradiation is preferably 80° C. to 280° C. and more preferably 100° C. to 200° C. The time for applying heat is preferably 5 to 60 minutes and more preferably 15 to 45 minutes.

The concavo-convex pattern formed in the resin layer can take any form. For example, there are a lattice-like mesh pattern in which the opening shape of the concave portion is regular tetragonal or rectangular; a honeycomb pattern in which a concave portion is regular hexagonal; a sea island pattern in which a concave portion is circular; a compound pattern such as a combination of a regular pentagon/a regular hexagon as a concave portion, or a combination of circular shapes with different diameters; and a pattern with in-plane distribution in size of hexagon.

Above all, from the viewpoint of suppressing defects of a septum at the time of releasing a resin layer from a mold in the case of forming the resin layer by a photoimprinting method, of shortening the ingress distance, or the like, a regular polygonal pattern such as a square or regular hexagonal pattern, and a circular pattern are preferable. In addition, a regular hexagonal pattern is more preferable from the viewpoint of increasing the filling ratio (area ratio) of the fluorescent region.

Incidentally, the ingress distance is a distance at which a change in chromaticity or a reduction in luminance can be confirmed by visual observation. In the present invention, the ingress distance is a distance in the vertical direction from the cut end face in a case where the wavelength conversion member is cut so as to straddle the fluorescent region.

Further, in the above example, the step of curing the resin layer is carried out in a state where the mold is attached, but it may be carried out after releasing of the mold. It is preferable to carry out the step of curing the resin layer in a state where the mold is closely attached.

In the case of carrying out a thermal imprinting method, it is usually preferably carried out at a mold pressure in the range of 0.1 to 100 MPa. In addition, it is preferable to set the temperature of the mold and the resin layer within a predetermined range. Generally, it is often to set the mold temperature to be equal to or higher than the glass transition temperature (Tg) of the resin layer, and set the substrate temperature lower than the mold temperature.

In a case of carrying out a melt molding method, a resin to be molded is heated to a temperature equal to or higher than the melting point thereof, and the resin (melt) in a molten state is immediately flowed between the mold and the substrate film, followed by pressing and cooling to prepare a molded article. Specific examples of a material suitable for the resin layer 38 in a case of carrying out the melt molding method include polyester-based resins such as polyvinyl alcohol (PVA), polyethylene-vinyl alcohol copolymer (EVOH), polyvinylidene chloride (PVDC), polyvinylidene fluoride (PVDF), and polyethylene terephthalate (PET). Among them, (modified) polyvinyl alcohol is preferable and polyethylene-vinyl alcohol copolymer (EVOH) is particularly preferable from the viewpoint of excellent transparency and excellent heat resistance and light resistance.

An anchor coat layer may be provided on the substrate film in order to ensure adhesiveness with the substrate film forming the resin layer. The material of the anchor coat layer is appropriately selected according to the material of the resin layer and the substrate film. For example, in a case where the resin layer is EVOH and the substrate film is PET, a urethane-based compound, a polyethyleneimine-based compound, a polybutadiene-based compound, or a (modified) polyolefin-based compound can be mentioned as the material of the anchor coat layer. From the viewpoint of excellent water resistance and adhesion force, an anchor coat material of a urethane-based compound or a (modified) polyolefin-based compound is most preferable. Specific examples of products include EL-530A/B (manufactured by Toyo-Morton, Ltd.), and TAKELAC A/TAKENATE A series, ADMER series, UNISTOLE series (all manufactured by Mitsui Chemicals, Inc.).

"Backlight Unit"

Figure 10:
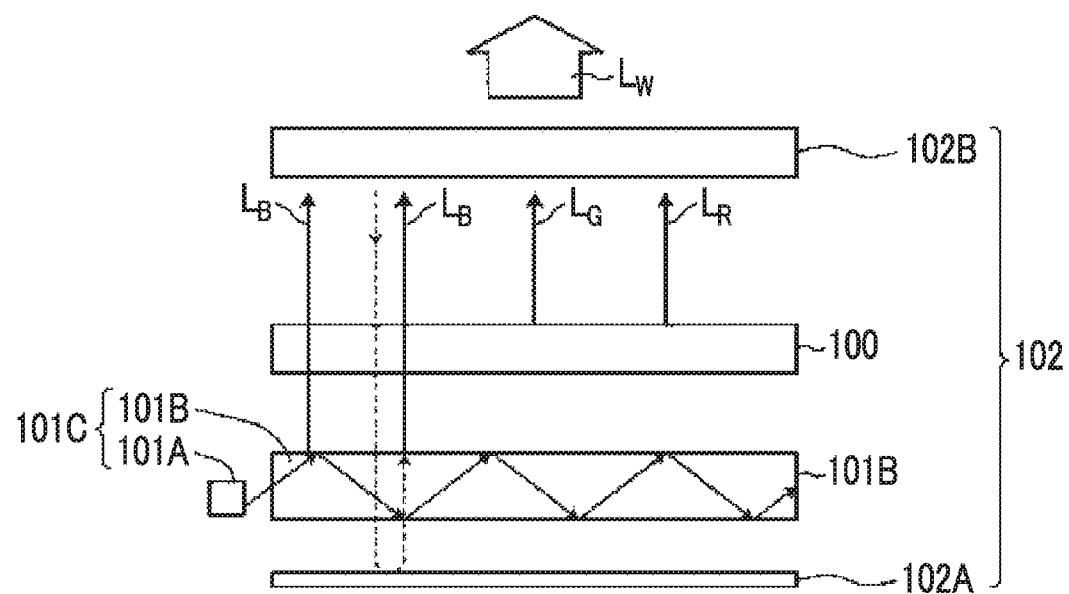
FIG. 10 is a cross-sectional view of a schematic configuration of a backlight unit comprising a wavelength conversion member.

With reference to the drawings, a description will be given of a backlight unit comprising the wavelength conversion member according to the embodiment of the present invention. FIG. 10 is a schematic view showing a configuration of a side edge type backlight unit as an example of the backlight unit.

As shown in FIG. 10, the backlight unit 102 comprises a planar light source 101C including a light source 101A that emits primary light (blue light $L_B$) and a light guide plate 101B that guides and emits primary light emitted from the light source 101A, a wavelength conversion member 100 according to the embodiment of the present invention comprised on the planar light source 101C, a reflective plate 102A disposed opposite to the wavelength conversion member 100 with the planar light source 101C interposed therebetween, and a retroreflective member 102B. In FIG. 10, the reflective plate 102A, the light guide plate 101B, the wavelength conversion member 100, and the retroreflective member 102B are spaced apart from one another, but this shows that those components are not optically in intimate attachment with one another, and those components may actually be laminated.

The wavelength conversion member 100 emits fluorescence by using at least a part of the primary light $L_B$ emitted from the planar light source 101C as excitation light and emits the secondary light (green light $L_G$ and red light $L_R$) composed of this fluorescence and the primary light $L_B$ transmitted through the wavelength conversion member 100. For example, the wavelength conversion member 100 is a wavelength conversion member which is configured such that the wavelength conversion layer including the quantum dots that emit the green light $L_G$ and the quantum dots that emit the red light $L_R$ upon irradiation with the blue light $L_B$ is sandwiched between the first substrate film and the second substrate film.

In FIG. 10, $L_B$, $L_G$, and $L_R$ emitted from the wavelength conversion member 100 are incident on the retroreflective member 102B, and each incident light repeats reflection between the retroreflective member 102B and the reflective plate 102A and passes through the wavelength conversion member 100 many times. As a result, in the wavelength conversion member 100, a sufficient amount of excitation light (blue light $L_B$) is absorbed by the phosphors 31 (in this case, quantum dots) in the wavelength conversion layer 30 and a necessary amount of fluorescence ($L_G$ and $L_R$) is emitted, and the white light $L_W$ is embodied from the retroreflective member 102B and is emitted.

From the viewpoint of realizing high luminance and high color reproducibility, it is preferred to use, as the backlight unit, one formed into a multi-wavelength light source. For example, preferred is a backlight unit which emits blue light having a luminescence center wavelength in the wavelength range of 430 to 480 nm and having a luminescence intensity peak with a half-width of 100 nm or less, green light having a luminescence center wavelength in the wavelength range of 500 to 600 nm and having a luminescence intensity peak with a half-width of 100 nm or less, and red light having a luminescence center wavelength in the wavelength range of 600 nm to 680 nm and having a luminescence intensity peak with a half-width of 100 nm or less.

From the viewpoint of further improving luminance and color reproducibility, the wavelength range of the blue light emitted from the backlight unit is more preferably 440 nm to 460 nm.

From the same viewpoint, the wavelength range of the green light emitted from the backlight unit is preferably 520 nm to 560 nm and more preferably 520 nm to 545 nm. In addition, from the same viewpoint, the wavelength range of the red light emitted from the backlight unit is more preferably 610 nm to 650 nm.

In addition, from the same viewpoint, all the half-widths of the respective luminescence intensities of the blue light, the green light, and the red light emitted from the backlight unit are preferably 80 nm or less, more preferably 50 nm or less, still more preferably 40 nm or less, and particularly preferably 30 nm or less. Among them, the half-width of the luminescence intensity of the blue light is particularly preferably 25 nm or less.

In the above description, the light source 101A is, for example, a blue light-emitting diode that emits blue light having a luminescence center wavelength in the wavelength range of 430 nm to 480 nm, but an ultraviolet light-emitting diode that emits ultraviolet light may be used. As the light source 101A, a laser light source or the like may be used in addition to light emitting diodes. In a case of comprising a light source that emits ultraviolet light, the wavelength conversion layer of the wavelength conversion member may include a phosphor that emits blue light, a phosphor that emits green light, and a phosphor that emits red light, upon irradiation with ultraviolet light.

As shown in FIG. 10, the planar light source 101C may be a planar light source including the light source 101A and the light guide plate 101B which guides the primary light emitting from the light source 101A and allows the guided primary light to emit, or may be a planar light source in which the light source 101A and the wavelength conversion member 100 are disposed parallel to each other on the plane, and a diffusion plate is comprised in place of the light guide plate 101B. The former planar light source is generally referred to as an edge light mode backlight unit, and the latter planar light source is generally referred to as a direct backlight mode backlight unit.

In the present embodiment, a case where a planar light source is used as a light source has been described as an example, but a light source other than the planar light source may also be used as the light source.

(Configuration of Backlight Unit)

In FIG. 10, an edge light mode backlight unit including a light guide plate, a reflective plate, and the like as constituent members has been illustrated as the configuration of the backlight unit, but the backlight unit may be a direct backlight mode backlight unit A known light guide plate can be used as the light guide plate without any limitation.

In addition, the reflective plate 102A is not particularly limited, and known reflective plates can be used, which are described in JP3416302B, JP3363565B, JP4091978B, and JP3448626B, and the like, the contents of which are incorporated by reference herein in their entirety.

The retroreflective member 102B may be configured of a known diffusion plate or a known diffusion sheet, a known prism sheet (for example, BEF series manufactured by Sumitomo 3M Limited), a known light guide device, and the like. The configuration of the retroreflective member 102B is described in JP3416302B, JP3363565B, JP4091978B, JP3448626B, and the like, the contents of which are incorporated by reference herein in their entirety.

The backlight unit according to the embodiment of the present invention can be suitably used as a backlight for a liquid crystal display device.

EXAMPLES

Hereinafter, the present invention will be more specifically described with reference to Examples. The materials, use amounts, proportions, treatment contents, treatment procedures, and the like shown in the following Examples can be appropriately modified without departing from the spirit of the present invention. Therefore, the scope of the present invention should not be construed as being limited to the following specific Examples.

Example 1

<Preparation of Wavelength Conversion Member>

A wavelength conversion member having a wavelength conversion layer was prepared using a coating liquid containing quantum dots as a phosphor.

(Substrate Film)

A polyethylene terephthalate (PET) film (trade name "COSMOSHINE (registered trademark) A4300", manufactured by Toyobo Co., Ltd., thickness: 50 μm) was used as the first substrate film and the second substrate film.

(Formation of Resin Layer)

The following curable composition 1 was prepared, filtered through a polypropylene filter having a pore diameter of 0.2 μm, and then dried under reduced pressure for 30 minutes to obtain a coating liquid A for forming a resin layer.

—Curable Composition 1—

Dicyclopentanyl acrylate 78.4 parts by mass
(FA-513AS, manufactured by Hitachi Chemical Co., Ltd.)
Tricyclodecane dimethanol diacrylate 20.0 parts by mass
(A-DCP, manufactured by Shin-Nakamura Chemical Co., Ltd.)
Photopolymerization initiator 0.2 parts by mass
(IRGACURE TPO, manufactured by BASF Corporation)

—Formation of Resin Layer—

The coating liquid A for forming a resin layer was applied onto a first substrate film using a roll-to-roll type production apparatus, and the concave portions were transferred, followed by photocuring to form a resin layer 38 having a plurality of concave portions.

Here, the concave portion had a square shape of 250 μm×250 μm and was formed in a lattice-like pattern. The depth of the concave portion was 40 μm, and the width between the concave portions was 50 μm. In addition, the surface roughness Ra of the resin layer after the preparation thereof was adjusted to 1 μm by giving a fine concavo-convex shape to the mold for transferring the concave portions.

For photocuring, the resin layer was cured by irradiation with ultraviolet light at a dose of 2000 mJ/cm² from the first substrate film side using an air-cooled metal halide lamp (manufactured by Eye Graphics Co., Ltd.) at 160 W/cm.

(Formation of Fluorescent Region and Adhesion of Second Substrate Film)

The following curable composition 2 was prepared, filtered through a polypropylene filter having a pore diameter of 0.2 μm, and then dried under reduced pressure for 30 minutes to obtain a coating liquid a for forming a fluorescent region.

—Curable Composition 2—

Toluene dispersion liquid of quantum dot 1 (emission maximum: 530 nm) 20 parts by mass
Toluene dispersion liquid of quantum dot (emission maximum: 620 nm) 22 parts by mass
Dicyclopentanyl acrylate 78.4 parts by mass
(FA-513AS, manufactured by Hitachi Chemical Co., Ltd.)
Tricyclodecane dimethanol diacrylate 20.0 parts by mass
(A-DCP, manufactured by Shin-Nakamura Chemical Co., Ltd.)
Photopolymerization initiator 0.2 parts by mass
(IRGACURE TPO, manufactured by BASF Corporation)
Antioxidant 0.4 parts by mass
(trioctyl phosphite, manufactured by Tokyo Chemical Industry Co., Ltd.)

The concentration of quantum dots in the toluene dispersion liquid of quantum dot 1 and quantum dot 2 is 3% by mass.

Quantum dot 1 (INP 530-100, manufactured by NN-Labs, LLC.) is a core/shell type quantum dot whose core is InP and shell is ZnS, and has a luminescence center wavelength of 530 nm.

Quantum dot 2 (INP 620-100, manufactured by NN-Labs, LLC.) is a core/shell type quantum dot whose core is InP and shell is ZnS, and has a luminescence center wavelength of 620 nm.

—Application of Coating Liquid for Forming Fluorescent Region and Adhesion of Substrate Film—

Using a roll-to-roll type production apparatus, the coating liquid a for forming a fluorescent region was applied onto a resin layer having a plurality of concave portions so that the concave portions were filled with the coating liquid a, and a second substrate film was adhered, followed by photocuring to form a wavelength conversion layer in which fluorescent regions were formed in a plurality of concave portions of the resin layer, thereby preparing a wavelength conversion member.

For photocuring, the fluorescent region was cured by irradiation with ultraviolet light at a dose of 2000 mJ/cm² from the first substrate film side using an air-cooled metal halide lamp (manufactured by Eye Graphics Co., Ltd.) at 160 W/cm, followed by further heating at 80° C. for 10 minutes.

The thickness of the wavelength conversion layer of the obtained wavelength conversion member was 50 μm.

Sample 1 in which the cured layer was formed with the same composition and under the same curing conditions as in the resin layer contained in the wavelength conversion member prepared in Example 1 was prepared on a glass substrate. Similarly, sample 2 in which the cured layer was formed with the same composition and under the same curing conditions as in the fluorescent region contained in the wavelength conversion member prepared in Example 1 was prepared on a glass substrate.

Using each sample, the refractive index at a wavelength of 550 nm in the in-plane direction and the thickness direction of the cured layer on the glass substrate was measured with a multi-wavelength Abbe refractometer DR-M2 (manufactured by Atago Co., Ltd.).

The refractive index of the resin layer (sample 1) was 1.45. The refractive index of the fluorescent region (sample 2) was 1.55. That is, the refractive index difference Δn between the resin layer and the fluorescent region was 0.1.

Comparative Example 1

A wavelength conversion member was prepared in the same manner as in Example 1, except that a layered fluorescent region was formed on a resin layer having no concave portion.

Specifically, the coating liquid A for forming a resin layer was applied onto the first substrate film, and then a rough surface was transferred on the coating film using a flat plate-like mold having a surface roughness such that Ra becomes 1, followed by photocuring to form a resin layer.

Next, the coating liquid a for forming a fluorescent region was applied onto the formed resin layer, and then a second substrate film was adhered, followed by photocuring to form a wavelength conversion layer in which a layered fluorescent region was formed on the resin layer, thereby preparing a wavelength conversion member.

The thickness of the resin layer was 10 μm and the thickness of the fluorescent region was 40 μm.

Comparative Example 2

A wavelength conversion member was prepared in the same manner as in Example 1, except that the resin layer was not roughened.

Example 2

A wavelength conversion member was prepared in the same manner as in Example 1, except that a coating liquid b for forming a fluorescent region, which was obtained by preparing the following curable composition 3 as a coating liquid for forming a fluorescent region, followed by filtration through a polypropylene filter having a pore diameter of 0.2 μm and drying under reduced pressure for 30 minutes, was used.

The refractive index of the formed fluorescent region was 1.95. Therefore, the refractive index difference Δn between the resin layer and the fluorescent region was 0.5.

—Curable Composition 3—
Toluene dispersion liquid of quantum dot 1 (emission maximum: 530 nm) 16 parts by mass
Toluene dispersion liquid of quantum dot 2 (emission maximum: 620 nm) 1.6 parts by mass
Dicyclopentanyl acrylate 78.4 parts by mass
(FA-513AS, manufactured by Hitachi Chemical Co., Ltd.)
Tricyclodecane dimethanol diacrylate 20.0 parts by mass
(A-DCP, manufactured by Shin-Nakamura Chemical Co., Ltd.)
Photopolymerization initiator 0.2 parts by mass
(IRGACURE TPO, manufactured by BASF Corporation)
Antioxidant 0.4 parts by mass
(trioctyl phosphite, manufactured by Tokyo Chemical Industry Co., Ltd.)
Refractive index adjuster 20.0 parts by mass
(titanium oxide ($TiO_2$) particles (primary particle diameter: 100 nm or less), particle concentration: 30% by mass)

Examples 3 and 4 and Comparative Examples 3 to 5

Wavelength conversion members were prepared in the same manner as in Example 2, except that the surface roughness Ra of the resin layer was changed to values shown in Table 2 and the thickness of the wavelength conversion layer was set to 40 μm.

Example 5

A wavelength conversion member was prepared in the same manner as in Example 2, except that a coating liquid B for forming a resin layer, which was obtained by further adding 20 parts by mass of light scattering particles (TOSPEARL 120, manufactured by Momentive Performance Materials Inc.) to the coating liquid A, was used as the coating liquid for forming a resin layer, a coating liquid c for forming a fluorescent region, which was obtained by preparing the following curable composition 4, followed by filtration through a polypropylene filter having a pore diameter of 0.2 μm and drying under reduced pressure for 30 minutes, was used as the coating liquid for forming a fluorescent region; and the thickness of the wavelength conversion layer was 30 μm.

The refractive index of the formed resin layer was 1.45, and the refractive index of the fluorescent region was 1.95. Therefore, the refractive index difference Δn between the resin layer and the fluorescent region was 0.5.

—Curable Composition 4—
Toluene dispersion liquid of quantum dot 1 (emission maximum: 530 nm) 4 parts by mass
Toluene dispersion liquid of quantum dot 2 (emission maximum: 620 nm) 0.4 parts by mass
Dicyclopentanyl acrylate 78.4 parts by mass
(FA-513AS, manufactured by Hitachi Chemical Co., Ltd.)
Tricyclodecane dimethanol diacrylate 20.0 parts by mass
(A-DCP, manufactured by Shin-Nakamura Chemical Co., Ltd.)
Photopolymerization initiator 0.2 parts by mass
(IRGACURE TPO, manufactured by BASF Corporation)
Antioxidant 0.4 parts by mass
(trioctyl phosphite, manufactured by Tokyo Chemical Industry Co., Ltd.)
Refractive index adjuster 20.0 parts by mass
(titanium oxide ($TiO_2$) particles (primary particle diameter: 100 nm or less), particle concentration: 30% by mass)

Comparative Example 6

A wavelength conversion member was prepared in the same manner as in Example 5, except that the resin layer was not roughened.

Example 6

A wavelength conversion member was prepared in the same manner as in Example 5, except that the coating liquid A was used as the coating liquid for forming a resin layer; and a coating liquid d for forming a fluorescent region, which was obtained by further adding 20 parts by mass of light scattering particles (TOSPEARL 120, manufactured by Momentive Performance Materials Inc.) to the coating liquid c, was used as the coating liquid for forming a fluorescent region.

Example 7

A wavelength conversion member was prepared in the same manner as in Example 6, except that the coating liquid B was used as the coating liquid for forming a resin layer.

Comparative Example 7

A wavelength conversion member was prepared in the same manner as in Example 6, except that the resin layer was not roughened.

Example 8

A wavelength conversion member was prepared in the same manner as in Example 7, except that the substrate film B prepared as described below was used as the first substrate film and the second substrate film.

(Preparation of Substrate Film B)

Using a polyethylene terephthalate (PET) film (trade name "COSMOSHINE (registered trademark) A4300", manufactured by Toyobo Co., Ltd., thickness: 50 μm) as a support film, an organic layer and an inorganic layer were sequentially formed on one side of the support film by the following procedure to prepare a substrate film B.

—Formation of Organic Layer—

Trimethylolpropane triacrylate (product name "TMPTA", manufactured by Daicel-Allnex Ltd.) and a photopolymerization initiator (trade name "ESACURE (registered trademark) KTO46", manufactured by Lamberti S.p.A.) were prepared and weighed in a mass ratio of 95:5, and these were dissolved in methyl ethyl ketone to prepare a coating liquid having a solid content concentration of 15%. This coating liquid was applied on a PET film in a roll-to-roll process using a die coater and passed through a drying zone at 50° C. for 3 minutes. Thereafter, the coated film was irradiated with ultraviolet light under a nitrogen atmosphere (cumulative irradiation dose: about 600 mJ/cm$^2$), cured by ultraviolet curing, and wound up. The thickness of the organic layer formed on the support was 1 μm.

—Formation of Inorganic Layer—

Next, an inorganic layer (silicon nitride layer) was formed on the surface of the organic layer by using a roll-to-roll chemical vapor deposition (CVD) apparatus. Silane gas (flow rate: 160 sccm), ammonia gas (flow rate: 370 sccm), hydrogen gas (flow rate: 590 sccm), and nitrogen gas (flow rate: 240 sccm) were used as raw material gases. As a power source, a high-frequency power source with a frequency of 13.56 MHz was used. The film forming pressure was 40 Pa, and the film thickness reached was 50 nm. In this manner, a substrate film B was prepared in which an inorganic layer was laminated on the surface of the organic layer formed on the support film.

<Evaluation Items>

The tint of the wavelength conversion members prepared in Examples and Comparative Examples was measured as follows and the color reproducibility was evaluated.

(Measurement of Tint)

A backlight unit was taken out by disassembling a commercially available tablet terminal comprising a blue light source in the backlight unit (trade name "Kindle (registered trademark) Fire HDX 7", manufactured by Amazon, hereinafter sometimes simply referred to as "Kindle Fire HDX 7"). Instead of Quantum Dot Enhancement Film (QDEF) which is the wavelength conversion film incorporated into the backlight unit, each of wavelength conversion members of Examples or Comparative Examples cut into a rectangle was incorporated, and two optical sheets used for the tablet terminal were overlaid thereon. In this manner, a backlight unit was prepared.

The prepared backlight unit was turned on, the chromaticity (CIEx, y) was measured at nine points in the plane with a luminance meter (trade name "SR3", manufactured by Ibopcon Corporation) installed at a position 520 mm in the direction perpendicular to the light emitting surface of the backlight unit and then the average value of the measured values was calculated.

Evaluation was made according to the measured values based on the following standards.

A: one satisfying 0.21≤x≤0.23 and 0.24≤y≤0.26

B: one satisfying 0.19≤x<0.24 and 0.22≤y<0.27, and not included in A

C: one satisfying 0.15≤x<0.26 and 0.18≤y<0.29, and not included in A or B

D: Others

The results are shown in Tables 1 to 3.

TABLE 1

| | Wavelength conversion layer | | | | | | Substrate film | | Evaluation | |
|---|---|---|---|---|---|---|---|---|---|---|
| | Presence or absence of concave portion | Ra | Refractive index of resin layer | Refractive index of fluorescent region | Refractive index difference | Coating liquid for forming resin layer | Coating liquid for forming fluorescent region | First substrate film | Second substrate film | Chromaticity point | Judgment |
| Comparative Example 1 | Absent | 1 | 1.45 | 1.55 | 0.1 | Coating liquid A | Coating liquid a | Substrate film A | Substrate film A | (0.209, 0.233) | B |
| Comparative Example 2 | Present | — | 1.45 | 1.45 | 0 | Coating liquid A | Coating liquid a | Substrate film A | Substrate film A | (0.17, 0.208) | C |
| Example 1 | Present | 1 | 1.45 | 1.55 | 0.1 | Coating liquid A | Coating liquid a | Substrate film A | Substrate film A | (0.211, 0.241) | A |

TABLE 2

| | Wavelength conversion layer | | | | | | Substrate film | | Evaluation | |
|---|---|---|---|---|---|---|---|---|---|---|
| | Presence or absence of concave portion | Ra | Refractive index of resin layer | Refractive index of fluorescent region | Refractive index difference | Coating liquid for forming resin layer | Coating liquid for forming fluorescent region | First substrate film | Second substrate film | Chromaticity point | Judgment |
| Comparative Example 3 | Present | — | 1.45 | 1.95 | 0.5 | Coating liquid A | Coating liquid b | Substrate film A | Substrate film A | (0.163, 0.201) | C |
| Comparative Example 4 | Present | 0.2 | 1.45 | 1.95 | 0.5 | Coating liquid A | Coating liquid b | Substrate film A | Substrate film A | (0.206, 0.233) | B |

TABLE 2-continued

| | Wavelength conversion layer | | | | | | Substrate film | | Evaluation | |
|---|---|---|---|---|---|---|---|---|---|---|
| | Presence or absence of concave portion | Ra | Refractive index of resin layer | Refractive index of fluorescent region | Refractive index difference | Coating liquid for forming resin layer | Coating liquid for forming fluorescent region | First substrate film | Second substrate film | Chromaticity point | Judgment |
| Comparative Example 5 | Present | 7 | 1.45 | 1.95 | 0.5 | Coating liquid A | Coating liquid b | Substrate film A | Substrate film A | (0.204, 0.234) | B |
| Example 2 | Present | 0.5 | 1.45 | 1.95 | 0.5 | Coating liquid A | Coating liquid b | Substrate film A | Substrate film A | (0.214, 0.247) | A |
| Example 3 | Present | 1 | 1.45 | 1.95 | 0.5 | Coating liquid A | Coating liquid b | Substrate film A | Substrate film A | (0.217, 0.243) | A |
| Example 4 | Present | 5 | 1.45 | 1.95 | 0.5 | Coating liquid A | Coating liquid b | Substrate film A | Substrate film A | (0.219, 0.25) | A |

TABLE 3

| | Wavelength conversion layer | | | | | | Substrate film | | Evaluation | |
|---|---|---|---|---|---|---|---|---|---|---|
| | Presence or absence of concave portion | Ra | Refractive index of resin layer | Refractive index of fluorescent region | Refractive index difference | Coating liquid for forming resin layer | Coating liquid for forming fluorescent region | First substrate film | Second substrate film | Chromaticity point | Judgment |
| Comparative Example 6 | Present | — | 1.45 | 1.95 | 0.5 | Coating liquid B | Coating liquid c | Substrate film A | Substrate film A | (0.161, 0.206) | C |
| Comparative Example 7 | Present | — | 1.45 | 1.95 | 0.5 | Coating liquid A | Coating liquid d | Substrate film A | Substrate film A | (0.168, 0.207) | C |
| Example 5 | Present | 1 | 1.45 | 1.95 | 0.5 | Coating liquid B | Coating liquid c | Substrate film A | Substrate film A | (0.217, 0.245) | A |
| Example 6 | Present | 1 | 1.45 | 1.95 | 0.5 | Coating liquid A | Coating liquid d | Substrate film A | Substrate film A | (0.219, 0.243) | A |
| Example 7 | Present | 1 | 1.45 | 1.95 | 0.5 | Coating liquid B | Coating liquid d | Substrate film A | Substrate film A | (0.222, 0.254) | A |
| Example 8 | Present | 1 | 1.45 | 1.95 | 0.5 | Coating liquid B | Coating liquid d | Substrate film B | Substrate film B | (0.227, 0.26) | A |

From the results shown in Tables 1 to 3, it was found that the color reproducibility of white light is higher in Examples of the present invention than in Comparative Examples.

From the above results, the effects of the present invention are obvious.

EXPLANATION OF REFERENCES

1: wavelength conversion member
10, 20: substrate film
30: wavelength conversion layer
31: phosphor
33: binder
35: fluorescent region
38: resin layer
100: wavelength conversion member
101A: light source
101B: light guide plate
101C: planar light source
102: backlight unit
102A: reflective plate
102B: retroreflective member

What is claimed is:

1. A wavelength conversion member that absorbs at least a part of incident excitation light, converts the absorbed light into light having a wavelength different from the wavelength of the excitation light, and emits the wavelength-converted light, the wavelength conversion member comprising:
a wavelength conversion layer having a resin layer that is provided with a plurality of concave portions which are discretely disposed on one main surface thereof; and a plurality of fluorescent regions containing phosphors, which are disposed in the concave portions formed in the resin layer,
wherein a surface roughness Ra of a surface of the resin layer on a side where the concave portions are formed is 0.3 µm or more and less than 1 µm.

2. The wavelength conversion member according to claim 1, wherein a refractive index difference Δn between the resin layer and the fluorescent region is 0.05 or more.

3. The wavelength conversion member according to claim 1, wherein scattering particles are contained in at least one of the resin layer or the fluorescent region.

4. The wavelength conversion member according to claim 2, wherein scattering particles are contained in at least one of the resin layer or the fluorescent region.

5. The wavelength conversion member according to claim 1, wherein a depth of the concave portion formed in the resin layer is 1 to 150 µm.

6. The wavelength conversion member according to claim 4, wherein a depth of the concave portion formed in the resin layer is 1 to 150 µm.

7. The wavelength conversion member according to claim 1, wherein a width of the concave portion formed in the resin layer is 10 to 2000 µm.

8. The wavelength conversion member according to claim 6, wherein a width of the concave portion formed in the resin layer is 10 to 2000 µm.

9. The wavelength conversion member according to claim 1, wherein the wavelength conversion layer has two or more types of fluorescent regions that emit light in different wavelength ranges.

10. The wavelength conversion member according to claim 8, wherein the wavelength conversion layer has two or more types of fluorescent regions that emit light in different wavelength ranges.

11. The wavelength conversion member according to claim 1, further comprising two substrate films laminated with the wavelength conversion layer interposed therebetween.

12. The wavelength conversion member according to claim 10, further comprising two substrate films laminated with the wavelength conversion layer interposed therebetween.

13. The wavelength conversion member according to claim 1, wherein a thickness of the wavelength conversion layer is 5 to 150 µm.

14. The wavelength conversion member according to claim 12, wherein a thickness of the wavelength conversion layer is 5 to 150 µm.

15. A backlight unit comprising:
the wavelength conversion member according to claim 1; and
a light source for emitting excitation light.

16. A backlight unit comprising:
the wavelength conversion member according to claim 14; and
a light source for emitting excitation light.

* * * * *